US012667056B2

(12) United States Patent
Sasamoto

(10) Patent No.: US 12,667,056 B2
(45) Date of Patent: Jun. 30, 2026

(54) WORKING MACHINE AND WORKING DEVICE

(71) Applicant: KUBOTA CORPORATION, Osaka (JP)

(72) Inventor: Hirokazu Sasamoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 512 days.

(21) Appl. No.: 18/140,241

(22) Filed: Apr. 27, 2023

(65) Prior Publication Data

US 2023/0345879 A1 Nov. 2, 2023

(30) Foreign Application Priority Data

Apr. 28, 2022 (JP) ................................. 2022-074776

(51) Int. Cl.
*A01D 78/00* (2006.01)
*A01D 78/10* (2006.01)
*G07C 5/02* (2006.01)

(52) U.S. Cl.
CPC ....... *A01D 78/007* (2013.01); *A01D 78/1078* (2013.01); *G07C 5/02* (2013.01); *A01D 78/1071* (2013.01); *A01D 78/1085* (2013.01)

(58) Field of Classification Search
CPC .............. A01D 78/007; A01D 78/1071; A01D 78/1078; A01D 78/1085; G07C 5/02
See application file for complete search history.

(56) References Cited

U.S. PATENT DOCUMENTS

| | | | | |
|---|---|---|---|---|
| 11,559,003 | B2 * | 1/2023 | Ibuki | A01F 15/0825 |
| 12,336,455 | B2 * | 6/2025 | Roberge | A01D 78/001 |
| 2017/0359959 | A1 * | 12/2017 | Wägner | A01D 78/1085 |
| 2018/0303031 | A1 * | 10/2018 | Araki | A01F 15/00 |
| 2020/0319649 | A1 * | 10/2020 | Unesaki | G06Q 50/02 |

FOREIGN PATENT DOCUMENTS

| | | | | |
|---|---|---|---|---|
| EP | 3 607 813 A1 | 2/2020 | | |
| EP | 3 909 417 A1 | 11/2021 | | |
| EP | 3905109 A1 * | 11/2021 | ........... | G06V 20/188 |
| JP | 2020-096543 A | 6/2020 | | |

OTHER PUBLICATIONS

Official Communication issued in corresponding European Patent Application No. 23169635.2, mailed on Sep. 8, 2023.

* cited by examiner

*Primary Examiner* — Claude J Brown
(74) *Attorney, Agent, or Firm* — Keating & Bennett, LLP

(57) ABSTRACT

A raking machine includes a traveling vehicle, a rake coupled to the traveling vehicle to rake grass in an agricultural field and form a swath, a sensor to obtain a state of the grass or the swath in the agricultural field, and a controller to change, when the rake performs raking, setting information regarding the rake based on the state obtained by the sensor.

10 Claims, 23 Drawing Sheets

| Position of swath curtain | | | Swath curtain |
|---|---|---|---|
| Conditions | | | |
| | Width of formed swath (Check with rear camera) | | |
| Amount of grass during work (Check with front camera) | Smaller than or equal to first lower limit width (Small) | Larger than or equal to first upper limit width (Large) | Two-pile shape (Divided into two) |
| Larger than or equal to first upper limit value (Large) | First setting information (Pull out) | | |
| Smaller than or equal to first lower limit value (Small) | | Second setting information (Push in) | |

– Height of tines from ground

| Conditions | Height of tines |
| --- | --- |
| State of agricultural field (Check with front camera) | |
| First feature image (State of grass: Normal, Agricultural field: Flat) | Third setting information (First height: Low) |
| Second feature image (State of grass: Weak, soft) | Fourth setting information (Second height: High) |
| Third feature image (Agricultural field: Not flat, uneven) | Fifth setting information (Second height: High) |

Fig.9

– Travel speed

TB3

| Conditions | | Travel speed |
|---|---|---|
| Amount of grass during work (Check with front camera) | State of agricultural field (Check with front camera) | |
| Larger than or equal to first upper limit value (Large) | Third feature image (Uneven) | First speed (Reduce) |
| Smaller than or equal to first lower limit value (Small) | First feature image (Flat) | Second speed (Increase) |

Fig.10

– PTO rotation speed (rpm)

| Conditions (Check with rear camera) | | Conditions | Rotation speed of PTO shaft |
|---|---|---|---|
| Swath shape (Check with rear camera) | State of agricultural field (Check with front camera) | | |
| Fourth feature image (Triangular and hard) | | | First rotation speed (Reduce) |
| | Third feature image (Uneven) | | Second rotation speed (Increase) |

TB4

Fig.12
Width of formed swath
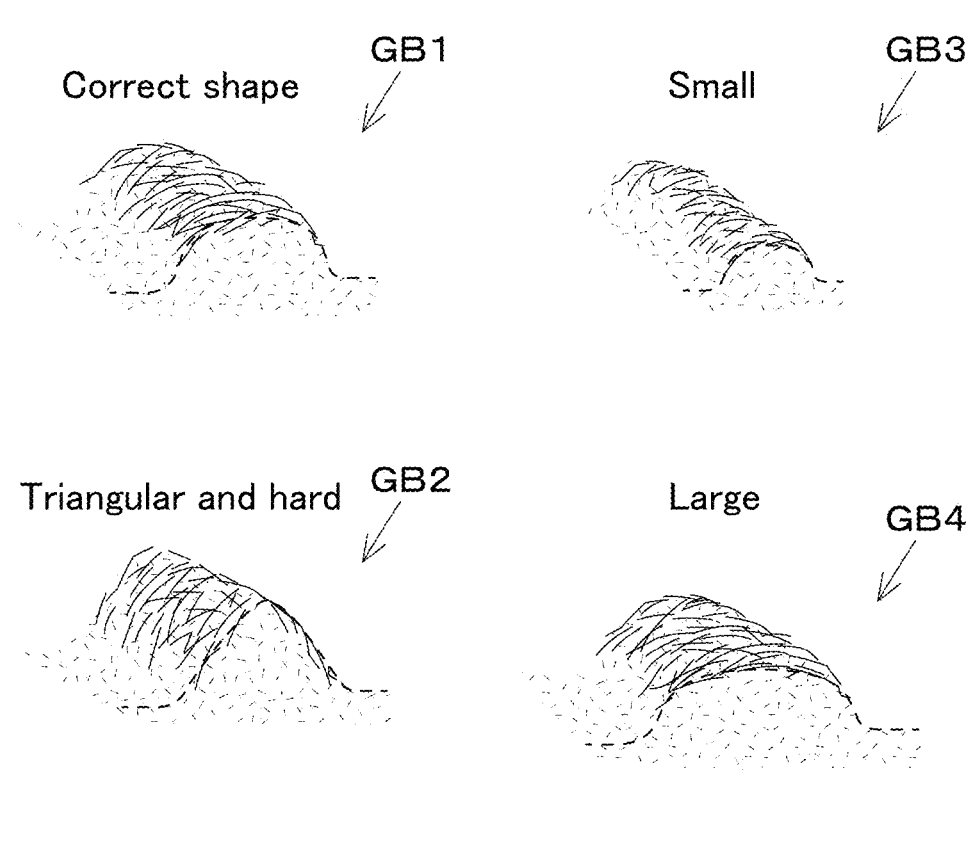
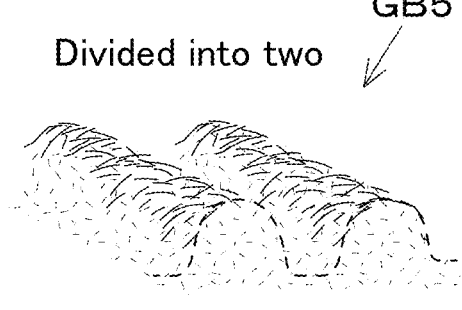

Fig.19

| Raking position | | Third moisture value (%) |
|---|---|---|
| Latitude | Longitude | |
| 34.40.41 | 135.34.19 | 19.5% |
| 34.40.42 | 135.34.19 | 14.0% |
| 34.40.43 | 135.34.19 | 18.6% |
| 34.40.44 | 135.34.19 | 16.7% |
| 34.40.45 | 135.34.19 | 19.2% |
| 34.40.46 | 135.34.19 | 15.2% |
| 34.40.47 | 135.34.19 | 17.6% |
| 34.40.48 | 135.34.19 | 11.0% |
| 34.40.49 | 135.34.19 | 16.6% |
| 34.40.50 | 135.34.19 | 14.8% |
| 34.40.51 | 135.34.19 | 14.6% |
| 34.40.52 | 135.34.19 | 17.1% |
| 34.40.53 | 135.34.19 | 19.0% |
| 34.40.54 | 135.34.19 | 18.0% |
| 34.40.55 | 135.34.19 | 14.1% |
| . . . | . . . | . . . |

WORKING MACHINE AND WORKING DEVICE

CROSS REFERENCE TO RELATED APPLICATIONS

This application claims the benefit of priority to Japanese Patent Application No. 2022-074776 filed on Apr. 28, 2022. The entire contents of this application are hereby incorporated herein by reference.

BACKGROUND OF THE INVENTION

1. Field of the Invention

The present invention relates to a working machine, such as a raking machine that performs raking, and a working device.

2. Description of the Related Art

Japanese Unexamined Patent Application Publication No. 2020-096543 discloses a raking machine including a tractor and a rake coupled to a rear portion of the tractor. Cut grass in an agricultural field is raked to form swaths by operating the rake towed by the tractor. Japanese Unexamined Patent Application Publication No. 2020-096543 also discloses a process where swaths formed as a result of raking are introduced into a roll baler or the like and the roll baler bales the swaths into a certain shape and discharges roll bales onto an agricultural field.

SUMMARY OF THE INVENTION

In practice, however, when cut grass in an agricultural field is raked, as in Japanese Unexamined Patent Application Publication No. 2020-096543, shapes of swaths vary depending on, for example, the amount of grass before the raking. When the shapes of the swaths are not constant (vary), it might be difficult to, for example, introduce the swaths into the roll baler and intervals of roll bales discharged from the roll baler might be unstable.

Preferred embodiments of the present invention address the above-described problem and easily make shapes of swaths and the like uniform.

Technical solutions in preferred embodiments of the present invention for addressing the technical problem are characterized as follows.

A working machine according to an aspect of a preferred embodiment of the present invention includes a traveling vehicle, a working device coupled to the traveling vehicle to rake grass in an agricultural field and form a swath, a sensor to obtain a state of the grass or the swath in the agricultural field, and a controller to, when the working device performs raking, change one or more pieces of setting information regarding the working device based on the state obtained by the sensor.

The sensor may include at least one imager to obtain imaging data by capturing an image of the state of the grass or the swath in the agricultural field. The controller may be configured or programmed to change the one or more pieces of setting information regarding the working device based on the imaging data obtained by the at least one imager.

The at least one imager may include a first imager to obtain imaging data by capturing an image of the state of the swath formed by the working device. The controller may be configured or programmed to change the one or more pieces of setting information regarding the working device based on the imaging data of a work product obtained by the first imager and indicating the state of the swath.

The at least one imager may include a second imager to obtain imaging data by capturing an image of the state of the grass in the agricultural field. The controller may be configured or programmed to change the one or more pieces of setting information regarding the working device based on the imaging data which is pre-work imaging data obtained by the second imager before raking is performed and indicating the state of the grass in the agricultural field.

The at least one imager may include a first imager to obtain imaging data by capturing an image of the state of the swath formed by the working device and a second imager to obtain imaging data by capturing an image of the state of the grass in the agricultural field. The controller may be configured or programmed to change the one or more pieces of setting information regarding the working device based on the imaging data of a work product obtained by the first imager and indicating the state of the formed swath, and the imaging data which is pre-work imaging data obtained by the second imager before raking is performed and indicating the state of the grass in the agricultural field.

The working device may include a rake assembly including a body, a rotor rotatably supported by the body, tine arms coupled to the rotor and radially extending from the rotor, one or more tines coupled to each of the tine arms and extending downward, and a plate to form the swath. The controller may be configured or programmed to change one of the one or more pieces of setting information regarding the working device that indicates a clearance between the plate and the body based on the imaging data of the work product.

The working device may include a rake assembly including a body, a rotor rotatably supported by the body, tine arms coupled to the rotor and radially extending from the rotor, one or more tines coupled to each of the tine arms and extending downward, and a plate. The controller may be configured or programmed to change one of the one or more pieces of setting information regarding the working device that indicates a clearance between the plate and the body based on the pre-work imaging data.

The working device may include a rake assembly including a body, a rotor rotatably supported by the body, tine arms coupled to the rotor and radially extending from the rotor, and one or more tines coupled to each of the tine arms and extending downward. The controller may be configured or programmed to change one of the one or more pieces of setting information regarding the working device that indicates a distance between a lower end of the rake assembly and the agricultural field based on the pre-work imaging data.

The working device may include a rake assembly including a body, a rotor rotatably supported by the body, tine arms coupled to the rotor and radially extending from the rotor, and one or more tines coupled to each of the tine arms and extending downward. The controller may be configured or programmed to change one of the one or more pieces of setting information regarding the working device that indicates travel speed of the traveling vehicle based on the pre-work imaging data.

The traveling vehicle may include a prime mover and a power take-off shaft driven by power from the prime mover. The working device may include a rake assembly including a body, a rotor which is rotatably supported by the body and to which power from the power take-off shaft is transmitted, tine arms coupled to the rotor and radially extending from the rotor, and one or more tines coupled to each of the tine arms and extending downward. The controller may be configured or programmed to change one of the one or more pieces of setting information regarding the working device that indicates a rotation speed of the power take-off shaft based on the pre-work imaging data.

The traveling vehicle may include a prime mover and a power take-off shaft driven by power from the prime mover. The working device may include a rake assembly including a body, a rotor which is rotatably supported by the body and to which power from the power take-off shaft is transmitted, tine arms coupled to the rotor and radially extending from the rotor, and one or more tines coupled to each of the tine arms and extending downward. The controller may be configured or programmed to change one of the one or more pieces of setting information regarding the working device that indicates a rotation speed of the power take-off shaft based on the imaging data of the work product.

The working machine may further include a position sensor to obtain measured position information. The controller may be configured or programmed to obtain one or more pieces of imaging data in a tedding step preceding a raking step, the one or more pieces of imaging data being associated with one or more pieces of positional information indicating one or more positions at which the one or more pieces of imaging data have been obtained, and change the one or more pieces of setting information regarding the working device based on one of the obtained one or more pieces of imaging data that corresponds to one of the one or more pieces of positional information that matches the measured position information obtained by the positioning device.

The working machine may further include a position sensor to obtain measured position information, a memory, and a communicator. The controller may be configured or programmed to generate work product record data in which the measured position information obtained by the positioning device and the imaging data of the work product are associated with each other, cause the memory to store the work product record data, and cause the communicator to transmit the work product record data stored in the memory to an external information processor.

A working device according to another aspect of a preferred embodiment of the present invention includes a rake assembly attachable to the traveling vehicle to rake grass in an agricultural field and form a swath. The rake assembly may be operable to, based on a state of the grass or the swath in the agricultural field, change a condition in which the swath is formed.

The rake assembly may be operable to, based on imaging data obtained by capturing an image of the state of the grass or the swath in the agricultural field, change the condition in which the swath is formed.

The rake assembly may be operable to, based on imaging data of a work product indicating the state of the swath formed by the rake assembly, a condition in which a next swath is formed.

The rake assembly may be operable to, based on pre-work imaging data indicating the state of the grass in the agricultural field before raking is performed by the rake assembly, change a condition in which a next swath is formed.

The rake assembly may include a body, a rotor rotatably supported by the body, tine arms coupled to the rotor and radially extending from the rotor, one or more tines coupled to each of the tine arms and extending downward, and a plate to form the swath. The plate may be operable to change a clearance between the plate and the body based on the imaging data or the pre-work imaging data.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 7 is a diagram illustrating a first data table.

FIG. 8 is a diagram illustrating a second data table.

FIG. 9 is a diagram illustrating a third data table.

FIG. 10 is a diagram illustrating a fourth data table.

FIG. 12 is a diagram illustrating another example of the images of swaths.

FIG. 19 is a diagram illustrating a relationship between raking positions and third moisture values.

DETAILED DESCRIPTION OF THE PREFERRED EMBODIMENTS

Figure 1:
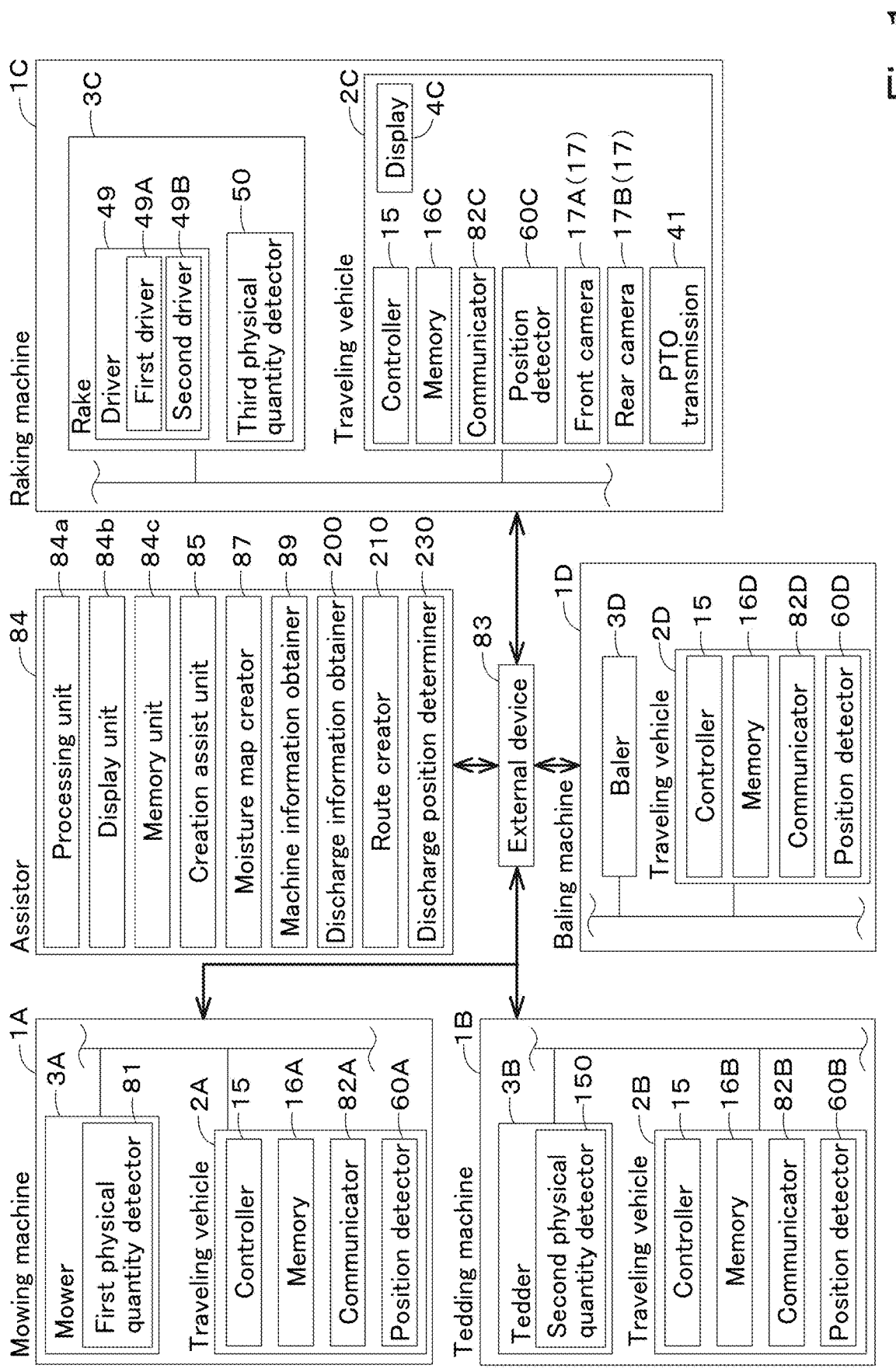
FIG. 1 is a diagram illustrating a grass management system.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will be described hereinafter based on the drawings.

FIG. 1 is a diagram illustrating the entirety of a grass management system. The grass management system is a system that manages matters relating to grass planted in an agricultural field.

Grass grown in an agricultural field is addressed by working machines of at least one type. FIG. 1 illustrates working machines of four types. The working machines of four types are a mowing machine 1A, a tedding machine 1B, a raking machine 1C, and a baling machine 1D. The mowing machine 1A mows grass in an agricultural field and discharges cut grass to the outside. The tedding machine 1B teds the grass (cut grass) in the agricultural field. The raking machine 1C forms swaths by raking the grass tedded in the agricultural field. The baling machine 1D collects the grass in the form of swaths and bales the collected grass into a certain shape, namely, for example, a cylindrical shape or a cuboid shape.

The mowing machine 1A includes a traveling vehicle 2A and a mower 3A coupled to the traveling vehicle 2A. The tedding machine 1B includes a traveling vehicle 2B and a tedder 3B coupled to the traveling vehicle 2B. The raking machine 1C includes a traveling vehicle 2C and a rake 3C coupled to the traveling vehicle 2C. The baling machine 1D includes a traveling vehicle 2D and a baler 3D coupled to the traveling vehicle 2D.

The traveling vehicles 2A, 2B, 2C, and 2D are tractors which can travel. First, the traveling vehicles 2A, 2B, 2C, and 2D will be described.

Figure 20:
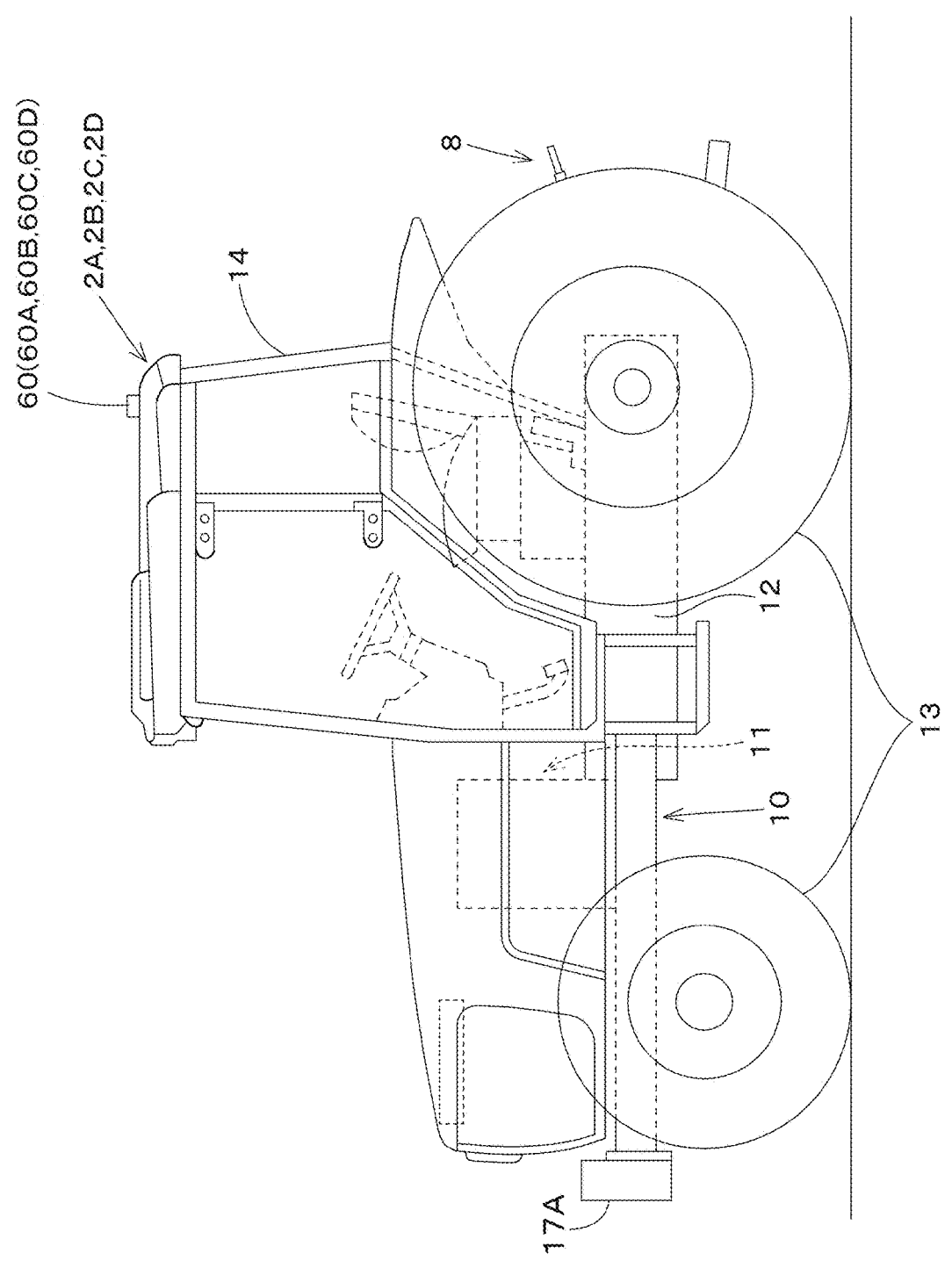
FIG. 20 is a diagram illustrating the entirety of a tractor.

As illustrated in FIG. 20, the traveling vehicles (tractors) 2A, 2B, 2C, and 2D each include a vehicle body 10, a prime mover 11, and a transmission 12. The vehicle body 10 is provided with a traveling device 13. The traveling device 13 includes front wheels and rear wheels. The traveling device 13 may be a crawler device. The prime mover 11 is a diesel engine, an electric motor, or the like and is a diesel engine in this preferred embodiment. The transmission 12 can change propelling force of the traveling device 13 and switch forward traveling and backward traveling of the traveling device 13. In addition, a coupler 8 including a three-point linkage is provided in a rear portion of the vehicle body 10. A working device (e.g., an implement) can be removably attached to the coupler 8. The working device is, for example, the mower 3A, the tedder 3B, the rake 3C, or the baler 3D. When a working device is coupled to the coupler 8, the vehicle body 10 can tow the working device. The traveling vehicles 2A, 2B, 2C, and 2D each include a PTO shaft driven by power from the prime mover 11 or the like and can transmit power of the PTO shaft to the working device. The traveling vehicles 2A, 2B, 2C, and 2D each include a cabin 14 including an operator's seat therein.

As illustrated in FIG. 1, the traveling vehicles 2A, 2B, 2C, and 2D each include a controller 15. The controller 15 controls a traveling system and a working system of each of the traveling vehicles 2A, 2B, 2C, and 2D based on operation signals at a time when operation actuators (an operation lever, an operation switch, an operation volume, etc.) provided around the operator's seat are used, detection signals of various sensors mounted on the vehicle body 10, and the like. For example, the controller 15 raises or lowers the working device based on use of the operation actuators (operation signals) and controls diesel engine speed based on an acceleration pedal sensor. The controller 15 may be any controller that controls the working system and the traveling system of each of the traveling vehicle 2A, 2B, 2C, and 2D and use any control method.

Figure 2A:
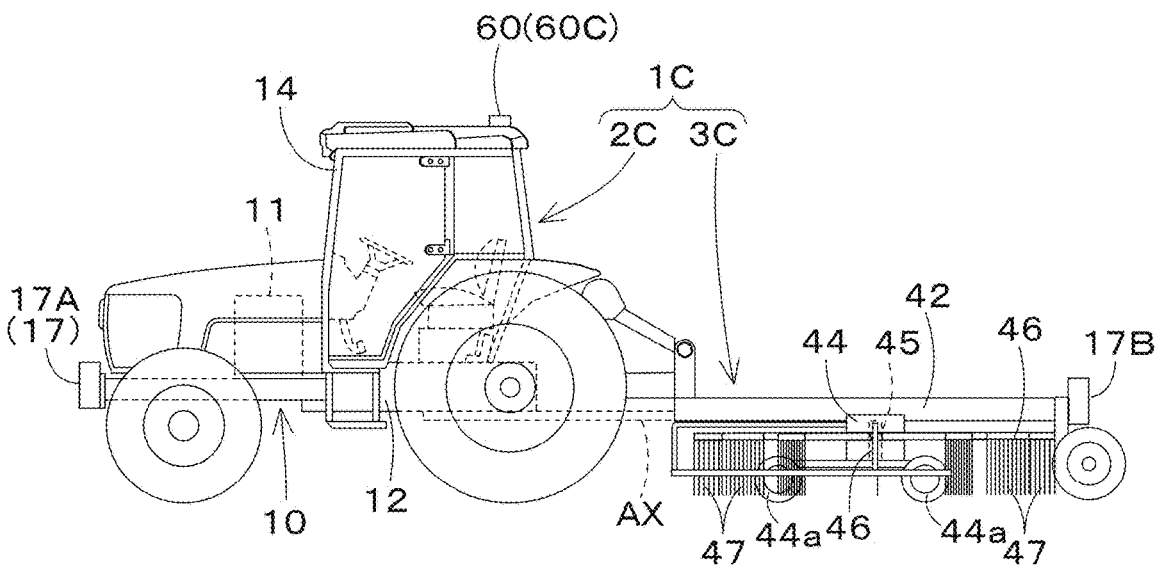
FIG. 2A is a side view of the entirety of a raking machine.
Figure 2B:
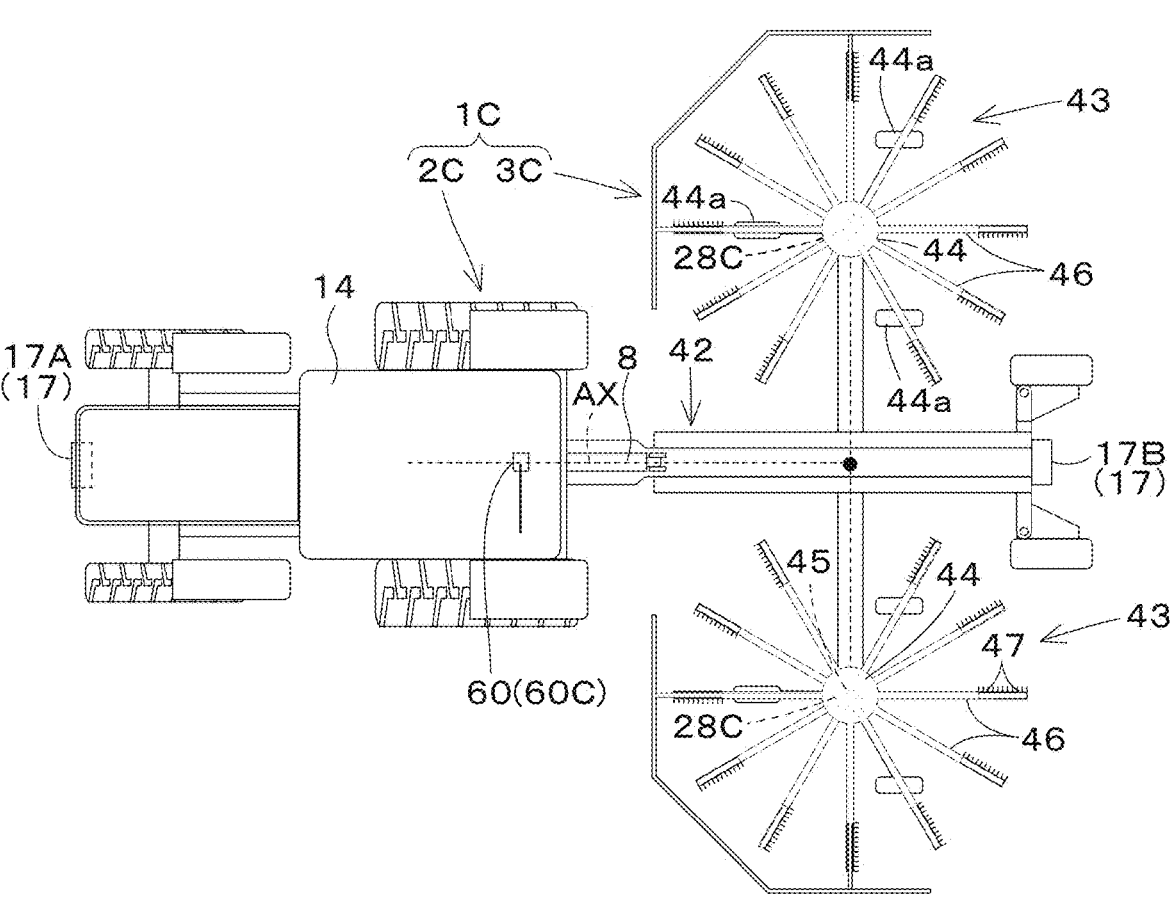
FIG. 2B is a plan view of the entirety of the raking machine.

As illustrated in FIGS. 2A and 2B, the rake 3C includes a coupling frame 42 coupled to the coupler 8 of the traveling vehicle 2C and rake units 43 coupled to the coupling frame 42. FIGS. 2A and 2B illustrate an example where two rake units 43 are coupled to the coupling frame 42. The rake units 43 each include a body 44 coupled to the coupling frame 42, a rotor 45 rotatably supported by the body 44, arms (tine arms) 46 coupled to the rotor 45, and one or more tines 47 coupled to each of the arms 46. The intervals between the tines 47 of the rake 3C are shorter than those between forks of the tedder 3B. The tines 47 are, for example, bifurcated members. Power from a PTO shaft AX is transmitted to each of the rotors 45 via a driving shaft 28C supported by the coupling frame 42, thus rotating the rotors 45. The rotation of the rotors 45 causes the arms 46 to rotate, and the tines 47 rake grass. That is, the rotation of the rotors 45 causes the tines 47 to rotate, and the tines 47 rake grass. The configuration of the rake 3C is not limited to the above, provided that the rake 3C rakes grass. The number of rake units 43, for example, may be one, or three or more. The rake units 43 may be of a rotary type in which a rotor to which tines 47 are attached rotates about a vertical axis, a belt/chain type in which tines 47 are attached to a belt or a chain that rotates, or any other type.

As illustrated in FIGS. 1 and 20, the grass management system includes at least one position detector 60 capable of detecting the position of a working machine. The at least one position detector 60 includes a position detector 60A that detects the position of the mowing machine 1A. The at least one position detector 60 includes a position detector 60B that detects the position of the tedding machine 1B. The at least one position detector 60 includes a position detector 60C that detects the position of the raking machine 1C. The at least one position detector 60 includes a position detector 60D that detects the position of the baling machine 1D.

The position detectors 60A, 60B, 60C, and 60D will be described. The position detector 60A is mounted on a roof of the cabin 14 of the traveling vehicle 2A. The position detector 60B is mounted on a roof of the cabin 14 of the traveling vehicle 2B. The position detector 60C is mounted on a roof of the cabin 14 of the traveling vehicle 2C. The position detector 60D is mounted on a roof of the cabin 14 of the traveling vehicle 2D. That is, the position detectors 60A, 60B, 60C, and 60D are each mounted on the corresponding traveling vehicle. Although the position detectors 60A, 60B, 60C, and 60D are each mounted on the roof of the corresponding cabin 14, a position on the tractor (traveling vehicle) at which each of the position detectors 60A, 60B, 60C, and 60D is mounted is not limited, and may be mounted at another position.

The position detectors 60A, 60B, 60C, and 60D detect positions (measured position information including latitude and longitude) thereof using a satellite positioning system. That is, the position detectors 60A, 60B, 60C, and 60D are capable of receiving signals (positions of positioning satellites, transmission times, correction information, etc.) transmitted from the positioning satellites and detecting the positions (e.g., latitude and longitude) thereof based on the received signals. The position detectors 60A, 60B, 60C, and 60D may detect not only the positions based on latitude and longitude but also information in a vertical direction (height direction), that is, height information.

Since the position detectors 60A, 60B, 60C, and 60D are provided on the mowing machine 1A, the tedding machine 1B, the raking machine 1C, and the baling machine 1D, respectively, a position during mowing, a position during tedding, a position during raking, and a position during baling can be individually detected. A memory (first memory) 16A of the traveling vehicle 2A stores the position(s) during the mowing. A memory 16B of the traveling vehicle 2B stores the position(s) during the tedding. A memory 16C of the traveling vehicle 2C stores the position(s) during the raking. A memory (second memory) 16D of the traveling vehicle 2D stores the position(s) during the baling.

As illustrated in FIG. 1, the grass management system includes a first physical quantity detector 81. The first physical quantity detector 81 detects physical quantity (quantities) relating to grass such as component(s) of grass (moisture content and/or protein). The first physical quantity detector 81 is provided in or on the mowing machine 1A. The first physical quantity detector 81 obtains at least moisture value(s) (first moisture value(s)) of grass at the time of mowing performed by the mowing machine 1A.

The first physical quantity detector 81 is provided in or on the mower 3A and obtains the first moisture value(s) of grass when the grass is mowed. The first physical quantity detector 81 is a spectrometer, for example, and analyzes the moisture in grass by emitting light having a certain frequency onto the grass and receiving light reflected from the grass. The first physical quantity detector 81 is connected to the controller 15 or the memory 16A of the traveling vehicle 2A. The controller 15 stores the first moisture value(s) obtained by the first physical quantity detector 81 and position(s) at which grass was mowed (hereinafter "mowing positions", latitude and longitude) detected by the position detector 60A in the memory 16A as map data regarding the first moisture values in which the first moisture values and the mowing positions are associated with each other.

As illustrated in FIG. 1, the traveling vehicle 2A includes a communicator 82A. The communicator 82A is connected to at least the memory 16A and outputs the map data regarding the first moisture values (the mowing positions and the first moisture values) stored in the memory 16A to an external device 83. The external device 83 is a mobile terminal such as a smartphone, a tablet, or a personal digital assistant (PDA). The communicator 82A is a short-distance communicator or a communicator that performs wireless communication over a mobile telephone communication network, a data communication network, or the like. The communicator 82A has a communication function by which the communicator 82A is connected to the external device 83 such that the map data regarding the first moisture values is transmitted to an assistor 84 (described later) through direct communication or indirect communication, and outputs the mowing positions and the first moisture values to the external device 83.

As illustrated in FIG. 1, the grass management system includes the assistor 84. The assistor 84 is, for example, a personal computer, a server, or the like owned by an administrator.

The assistor 84 includes a processing unit 84a such as a central processing unit (CPU), a display unit (display) 84b, and a memory unit 84c such as a nonvolatile memory. The assistor 84 also includes a connector to which the external device 83 can be connected. The display unit 84b displays various pieces of information and is achieved by a liquid crystal panel or the like.

The grass management system also includes a creation assist unit 85. The creation assist unit 85 includes electrical and electronic component(s) of the assistor 84 and/or program(s) incorporated in the processing unit 84a (assistor 84) and/or the like. The creation assist unit 85 assists creation of work plan(s) for the working machine(s). For example, the creation assist unit 85 assists creation of at least one of the following: a work plan for mowing performed by the mowing machine 1A; a work plan for tedding performed by the tedding machine 1B; a work plan for raking performed by the raking machine 1C; and a work plan for baling performed by the baling machine 1D.

Figure 3:
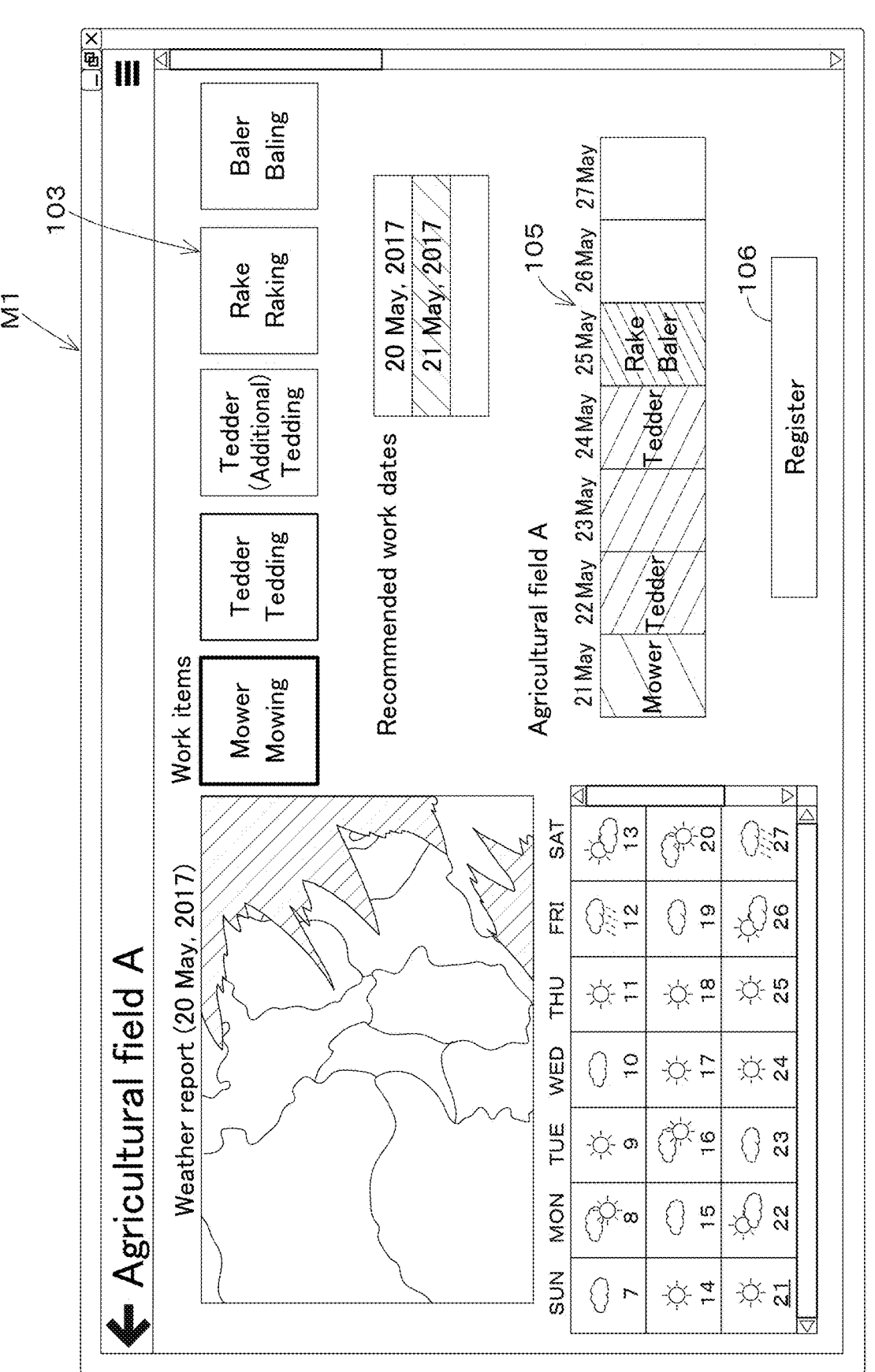
FIG. 3 is a diagram illustrating a creation screen.

When the administrator or another person operates the assistor 84, the creation assist unit 85 displays, on the display unit 84b, a creation screen M1 for creating a work plan as illustrated in FIG. 3. The creation screen M1 is a screen for setting a work plan in a certain agricultural field, that is, a predetermined plot. FIG. 3 illustrates the creation screen M1 for setting a work plan in an agricultural field A. An agricultural field owned by the administrator or another person is registered in advance in the assistor 84, and when agricultural fields are registered in advance, a work plan can be set for each of the agricultural fields. For convenience of description, it is assumed in the following description that a work plan is created for one agricultural field (agricultural field A).

The creation assist unit 85 displays, in the creation screen M1, a work item field 103, where the work items "mowing (mower)", "tedding (tedder)", "raking (rake)", and "baling (baler)" relating to grass-related work are displayed. The work items displayed in the work item field 103 are selectable. It is apparent from FIG. 3 that, because a work item selected in FIG. 3 is mowing, the creation screen M1 is a screen for setting a work plan beginning with mowing.

The creation assist unit 85 displays a planned date field 105 which displays dates inputted by the administrator on which mowing (mower), tedding (tedder), raking (rake), and baling (baler) are to be performed, for example.

Although the administrator or another person sets desired relationships between the work items and the dates in the planned date field 105 by operating the assistor 84 in the above preferred embodiment, the creation assist unit 85 may automatically create relationships between the work items and the dates in the planned date field 105. When the administrator or another person selects a button (register button) 106 displayed in the creation screen M1, the work plan set in the creation screen M1 is stored in the memory unit 84c of the assistor 84.

As described above, the creation assist unit 85 assists creation of a work plan. This makes it possible to set dates, work periods, and/or the like for a series of work items including mowing, tedding, raking, and then baling.

As described above, the mowing machine 1A can obtain the mowing positions and the first moisture values at the time of mowing. When the external device 83 is connected to the communicator 82A of the mowing machine 1A, the mowing positions and the first moisture values detected at the time of mowing can be stored in the external device 83. When the external device 83 is connected to the assistor 84, the memory unit 84c of the assistor 84 can obtain and store the mowing positions and the first moisture values stored in the external device 83.

The creation assist unit 85 can assist, using the mowing positions and the first moisture values thus detected at the time of the mowing, creation of a work plan for another working machine (the tedding machine 1B, the raking machine 1C, or the baling machine 1D) used after the mowing.

Figure 4:
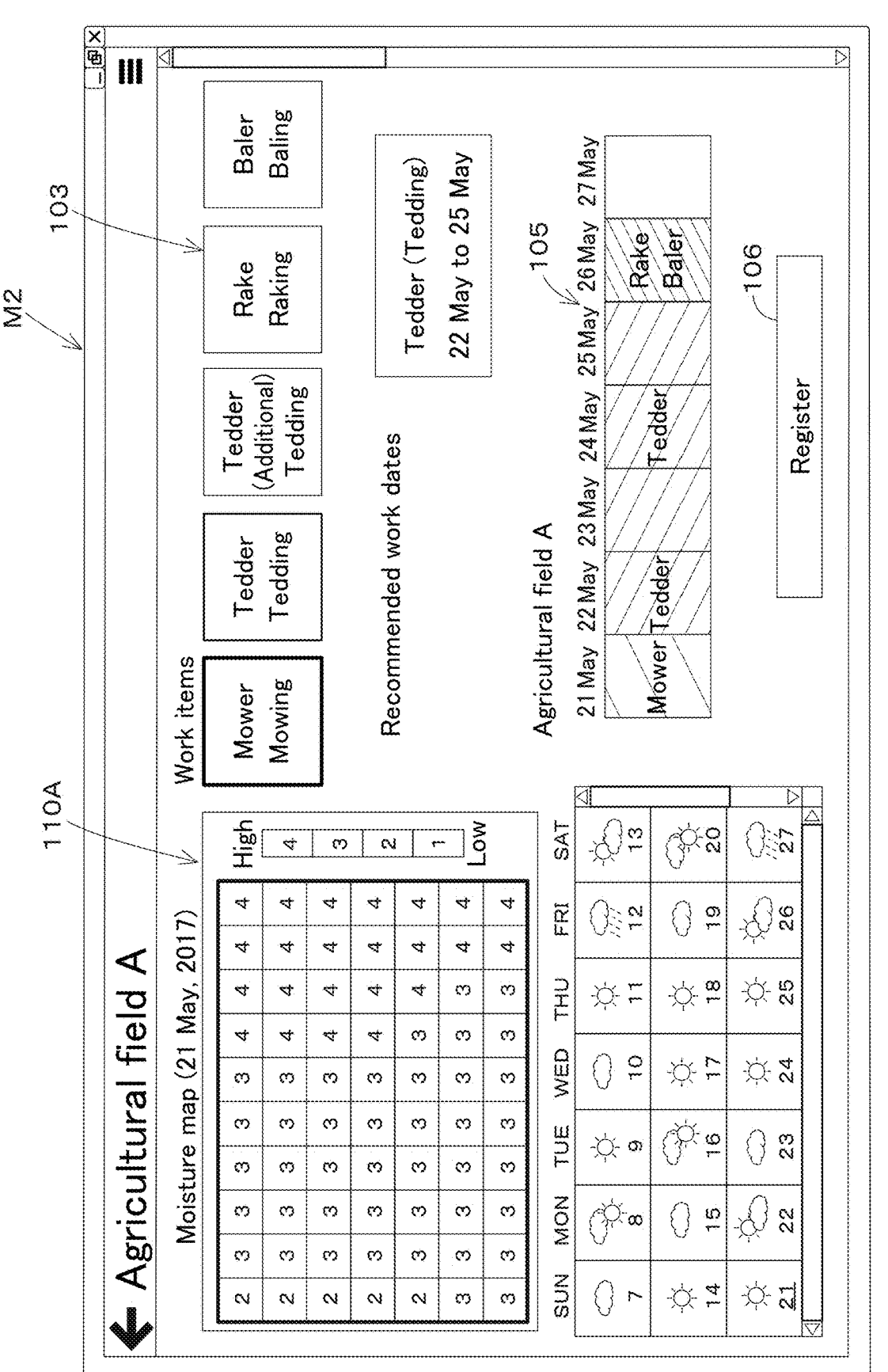
FIG. 4 is a diagram illustrating another creation screen.

FIG. 4 illustrates a creation screen M2 displayed when tedding is selected in the work item field 103 after mowing is set as illustrated in FIG. 3. The creation screen M2 illustrated in FIG. 4 displays the work item field 103 and the planned date field 105 as in FIG. 3.

When creating a work plan, the creation assist unit 85 displays, for example, a moisture map 110A in the creation screen M2. As illustrated in FIG. 4, the moisture map 110A is a map created by a moisture map creator 87. The moisture map creator 87 includes electrical and electronic component(s) of the assistor 84 and/or program(s) incorporated in the processing unit 84a (assistor 84) and/or another unit. The moisture map creator 87 creates the moisture map 110A for the agricultural field based on the first moisture values and the mowing positions.

Accordingly, the moisture map 110A at the time of mowing is displayed in the creation screen M2 for setting a work plan at least after mowing. Therefore, in the case where the administrator or another person can manually change the relationships between the work items and the dates in the planned date field 105 in the creation screen M2 as desired, the administrator or another person can change the date of tedding with reference to the moisture map 110A as desired.

Although the administrator or another person changes as desired the date shown in the planned date field 105 in the creation screen M2 while looking at the moisture map 110A displayed in the creation screen M2 in the above preferred embodiment, the creation assist unit 85 may set the date of work in a work plan based on the first moisture values.

As illustrated in FIG. 1, the grass management system includes a second physical quantity detector 150. As with the first physical quantity detector 81, the second physical quantity detector 150 detects physical quantity (quantities) relating to grass, such as component(s) of grass (moisture content and/or protein). The second physical quantity detector 150 is provided in or on the tedding machine 1B. The second physical quantity detector 150 obtains at least moisture value(s) (second moisture value(s)) of grass at the time of tedding performed by the tedding machine 1B.

The second physical quantity detector 150 is provided in or on the tedder 3B and obtains the second moisture value(s) of grass when the grass is tedded. The second physical quantity detector 150 is a spectrometer, for example, and analyzes the moisture in grass by emitting light having a certain frequency onto the grass and receiving light reflected from the grass. The second physical quantity detector 150 is connected to the controller 15 or the memory 16B of the traveling vehicle 2B. The controller 15 stores the second moisture value(s) obtained by the second physical quantity detector 150 and position(s) at which grass was tedded (hereinafter "tedding positions", latitude and longitude) detected by the position detector 60B in the memory 16B as map data regarding the second moisture values in which the second moisture values and the tedding positions are associated with each other.

As illustrated in FIG. 1, the traveling vehicle 2B includes a communicator 82B. The communicator 82B outputs the map data regarding the second moisture values (the tedding positions and the second moisture values) stored in the memory 16B to the external device 83. The external device 83 transmits the map data regarding the second moisture values to the assistor 84 through direct communication or indirect communication.

As illustrated in FIG. 1, the grass management system includes a topographic information obtainer. The topographic information obtainer obtains topographic information regarding an agricultural field. The topographic information obtainer obtains, as topographic information, height information regarding an agricultural field detected during mowing performed by the mowing machine 1A. More specifically, the topographic information obtainer is the position detector 60A provided in or on the mowing machine 1A. As described above, the position detector 60A detects not only the position (latitude and longitude) thereof but also the height (height information) thereof in the vertical direction (height direction) based on the signals transmitted from the positioning satellites during the mowing. The latitude and the longitude detected by the position detector 60A are two-dimensional (an X-axis direction and a Y-axis direction) information, and the height information is information in the vertical direction (Z-axis direction) of an agricultural field, which together define three-dimensional information, that is, the topographic information regarding the agricultural field, detected by the position detector 60A. The topographic information (latitude, longitude, and height) detected by the topographic information obtainer (position detector 60A) during the mowing is stored in the memory 16A and can be transferred to the external device 83 through the communicator 82A.

The topographic information obtainer may obtain, as the topographic information, the height information regarding the agricultural field detected during tedding performed by the tedding machine 1B. The topographic information obtainer includes, for example, the position detector 60B provided in or on the tedding machine 1B. The topographic information detected by the topographic information obtainer (position detector 60B) during tedding is stored in the memory 16B and can be transferred to the external device 83 through the communicator 82B.

The topographic information obtainer may obtain, as the topographic information, height information regarding the agricultural field detected during raking performed by the raking machine 1C. The topographic information obtainer is, for example, the position detector 60C provided in or on the raking machine 1C. The topographic information detected by the topographic information obtainer (position detector 60C) during raking is stored in the memory 16C. The memory 16C is connected to a communicator 82C, and the communicator 82C outputs the topographic information stored in the memory 16C to the external device 83.

The topographic information obtainer may be any device that obtains topographic information regarding an agricultural field. The topographic information obtainer is not limited to the position detector 60A, the position detector 60B, or the position detector 60C, and may be the position detector 60D provided in or on the baling machine 1D or may be provided in or on another working machine. An imager (topographic information obtainer) such as a camera may be provided in or on a multicopter, and an image obtained by the imager may be used as topographic information. Alternatively, a topographic information obtainer including a position detector 60 capable of detecting height may be provided in or on a fertilizer applicator that applies fertilizer to an agricultural field, a spreader that spreads chemicals over an agricultural field, or the like.

As illustrated in FIG. 1, the grass management system includes a discharge information obtainer 200 and a route creator 210. The discharge information obtainer 200 and the route creator 210 are included in the assistor 84. That is, the discharge information obtainer 200 and the route creator 210 include electrical and electronic component(s) of the assistor 84 and/or program(s) incorporated in the processing unit 84a (assistor 84) and/or another unit.

The discharge information obtainer 200 obtains planned discharge position(s) H1 in an agricultural field at which bale(s) formed by the baling machine 1D are to be discharged. The route creator 210 creates, based on the topographic information and the planned discharge positions H1 before the work is performed by the baling machine 1D, a traveling route R2 for the raking machine 1C that is to rake grass.

Figure 5:
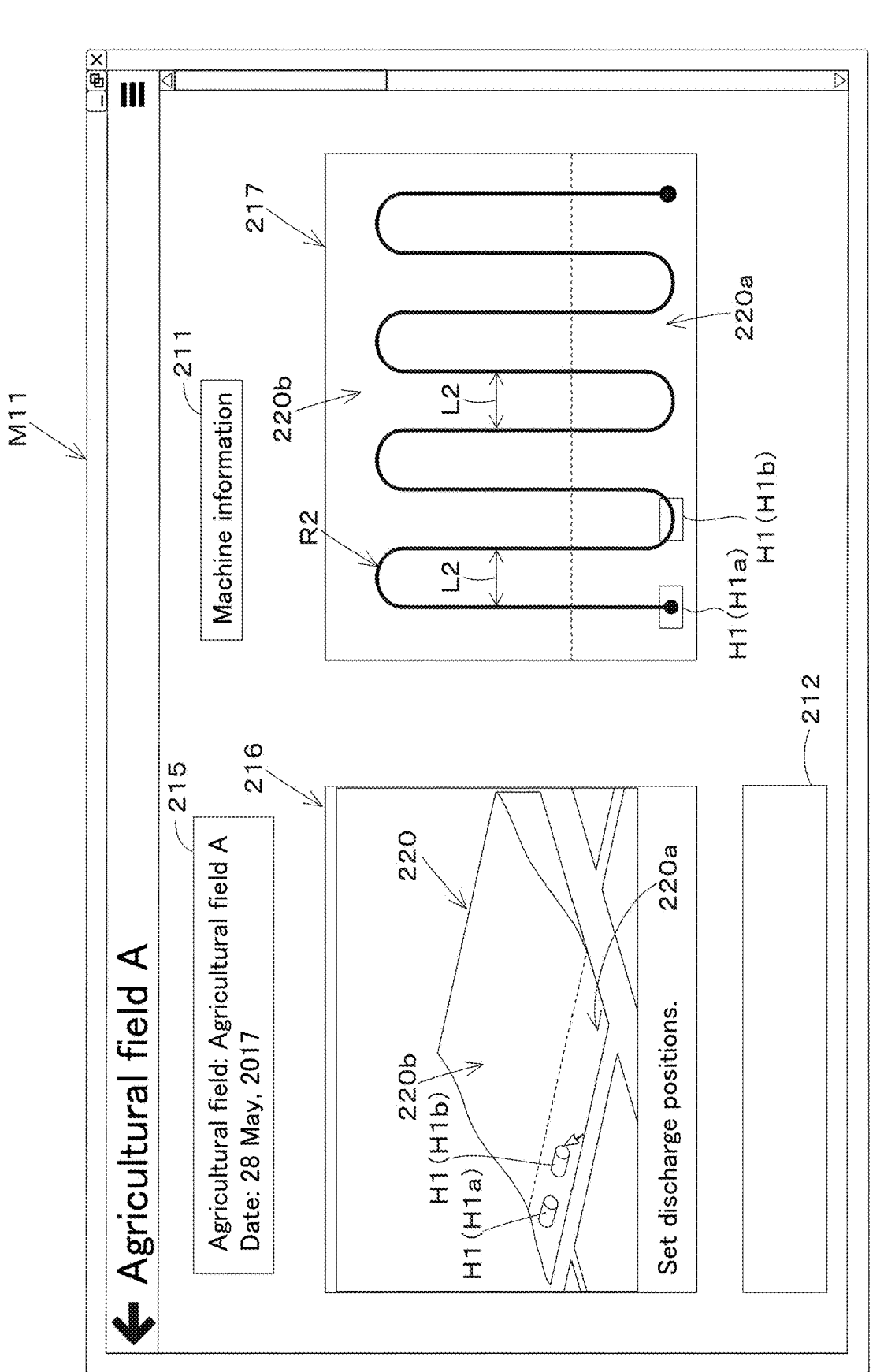
FIG. 5 is a diagram illustrating a setting screen.

FIG. 5 illustrates a setting screen M11 for setting the traveling route R2 displayed on the display unit 84b.

When the administrator or another person operates the assistor 84, the route creator 210 displays the setting screen M11 on the display unit 84b of the assistor 84. The setting screen M11 includes a setting field 215 for setting an agricultural field, a topography field 216 for displaying topography (topographic map) 220 of the agricultural field, and a route field 217 for displaying a traveling route.

When an agricultural field is set in the setting field 215, the route creator 210 refers to the memory unit 84c and extracts topographic information corresponding to the agricultural field set in the setting field 215. If there are pieces of topographic information for a single agricultural field, the route creator 210 extracts the latest piece of topographic information with the most recent date. If there are pieces of topographic information for a single agricultural field, the route creator 210 may display, in the setting screen M11, a list of times, dates, and/or the like at which the pieces of topographic information were obtained and extract a piece of topographic information selected from the list.

The route creator 210 displays a three-dimensional topographic map 220 in the topography field 216 based on the extracted piece of topographic information. Although the topographic map 220 is created based on a single piece of topographic information regarding an agricultural field in the above preferred embodiment, the topographic map 220 may be created using pieces of topographic information regarding an agricultural field. After creating the topographic map 220, the route creator 210 displays the topographic map 220 in the topography field 216.

In the topography field 216, that is, in the field in which the topographic map 220 is shown, the planned discharge positions H1 at which the baling machine 1D is to discharge bales can be set. When the administrator selects a position in the field of the topographic map 220 by using an input interface (a mouse, a keyboard, etc.) of the assistor 84, for example, the route creator (discharge position setter) 210 sets the selected position in the field as a planned discharge position H1 of a bale. That is, the discharge information obtainer 200 recognizes the position (latitude and longitude) selected in the field of the topographic map 220 as a planned discharge position H1, and obtains the planned discharge position H1. The discharge information obtainer 200, therefore, obtains a planned discharge position H1 each time a position in the field of the topographic map 220 is selected.

Although the discharge information obtainer 200 obtains a planned discharge position H1 each time a position in the field of the topographic map 220 is selected in the above preferred embodiment, the discharge information obtainer 200 may obtain, when a certain range in the field of the topographic map 220 is selected using the input interface or the like, position(s) included in the certain range as planned discharge position(s) H1.

Whether a bale can be appropriately discharged at a planned discharge position H1 may be determined when the planned discharge position H1 is set. That is, as illustrated in FIG. 1, the grass management system may include a discharge position determiner 230. The discharge position determiner 230 includes electrical and electronic component (s) of the assistor 84 and/or program(s) incorporated in the processing unit 84a (assistor 84) and/or another unit.

The discharge position determiner 230 determines, based on the topographic information, whether a planned discharge position H1 can be set. For example, the discharge position determiner 230 determines, based on the topographic information, whether a planned discharge position H1 or a surrounding area of the planned discharge position H1 selected in the field of the topographic map 220 is sloped. If the surrounding area of the planned discharge position H1 is a downward or upward slop, the discharge position determiner 230 determines that the planned discharge position H1 cannot be set and displays, in the setting screen M11, a warning indicating that the planned discharge position H1 is inappropriate. If a sloping area 220b is selected as a planned discharge position H1, for example, the discharge position determiner 230 determines that the planned discharge position H1 is inappropriate and displays a warning in the setting screen M11.

If the surrounding area of the planned discharge position H1 is flat, on the other hand, the discharge position determiner 230 determines that the planned discharge position H1 can be set. The discharge position determiner 230 then displays a piece of graphics or the like representing the planned discharge position H1 in the setting screen M11 and maintains the planned discharge position H1. If a planned discharge position H1 is set in a flat area 220a in the topographic map 220, for example, the discharge position determiner 230 determines that the planned discharge position H1 can be set and maintains the planned discharge position H1. If the surrounding area of the planned discharge position H1 is a downward or upward slope but the slope is so gentle that a discharged bale would not roll away from the planned discharge position H1, the discharge position determiner 230 determines that the planned discharge position H1 can be set.

After planned discharge position(s) H1 is/are set, the route creator 210 creates the traveling route R2 for the raking machine 1C. As illustrated in FIG. 5, for example, it is assumed in the following description that planned discharge positions H1 have been set in the flat area 220a in the topographic map 220.

The route creator 210 sets the traveling route R2 for the raking machine 1C in the direction of slope of the sloping area 220b. In other words, in the case where the sloping area 220b is located on the far side in the topographic map 220 and the flat area 220a is located on the near side in the topographic map and height increases in the direction from the near side to the far side in the topographic map 220, the route creator 210 sets the traveling route R2 for the raking machine 1C such that the traveling route R2 runs in the direction from the near side to the far side. The route creator 210 sets the traveling route R2 for the raking machine 1C such that positions at which the baling machine 1D is to discharge bales substantially match the planned discharge positions H1, assuming that the traveling route R2 for the raking machine 1C and a traveling route for the baling machine 1D match each other. As illustrated in FIG. 5, for example, when focusing upon two planned discharge positions H1a and H1b in the flat area 220a, the route creator 210 sets the traveling route R2 for the raking machine 1C such that the route goes from the planned discharge position H1a to the sloping area 220b and then turns around in the sloping area 220b and returns to the other planned discharge position H1b. The interval L2 between mutually adjacent portions of the traveling route R2 for the raking machine 1C is, for example, a predetermined width (work width) W1 with which the raking machine 1C is to rake grass.

After creating the traveling route R2, for example, the route creator 210 displays, in the route field 217, the traveling route R2 in two dimensions (an X-axis and a Y-axis). After creating the traveling route R2, the route creator 210 may display, in the route field 217, the traveling route R2 in three dimensions (an X-axis, a Y-axis, and a Z-axis).

Figure 6:
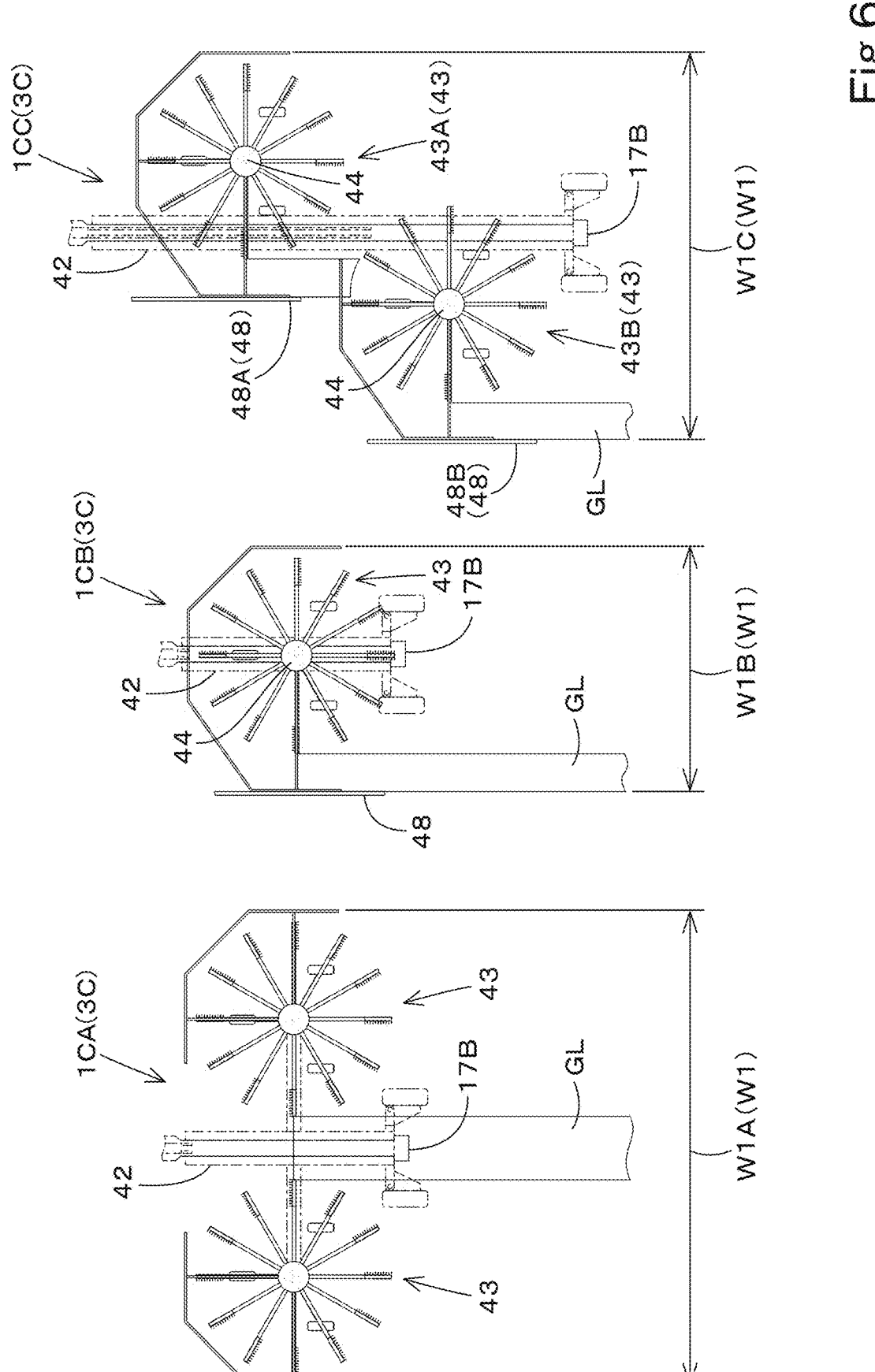
FIG. 6 is a diagram illustrating types of raking machine.

The route creator 210 may create the traveling route R2 based on information regarding the raking machine 1C, that is, machine information regarding the raking machine 1C. As illustrated in FIG. 6, there are the following types of raking machines 1C (rakes 3C): a first type 1CA in which two rake units 43 rake grass toward the widthwise center of the raking machine 1C; a second type 1CB in which one rake unit 43 rakes grass toward one of the opposite sides of the raking machine 1C in the width direction; a third type 1CC in which two rake units 43 rake grass toward the widthwise center of the raking machine 1C and one of the opposite sides of the raking machine 1C in the width direction; and the like. The first type 1CA, the second type 1CB, and the third type 1CC have different widths (work widths) W1A, W1B, and W1C with which grass is to be raked.

The first type 1CA is such that the two rake units 43 are disposed side-by-side with a certain distance (e.g., width of a swath GL) provided therebetween in the width direction of the raking machine 1C, and the swath GL is formed in the direction of travel of the raking machine 1C between the two rake units 43 whose rotation directions are different from each other. Grass (cut grass) captured by the two rake units 43 is discharged toward a position (central position) between the two rake units 43, and the swath GL is formed in the direction of travel the raking machine 1C. The second type 1CB is such that the rake unit 43 includes a plate-shaped member (a so-called "swath curtain") 48 for forming the swath GL, and the plate-shaped member 48 is disposed at a distance from a body 44 of the rake unit 43 in the width direction of the raking machine 1C. Grass (cut grass) captured by the rotating rake unit 43 is discharged toward the plate-shaped member 48 and hits the plate-shaped member 48, and the swath GL is formed in the direction of travel of the raking machine 1C. The third type 1CC is such that two rake units 43A and 43B are provided on the right and left sides of the raking machine 1C such that the rake units 43A and 43B are displaced from each other in the front-rear direction of the raking machine 1C. A first plate-shaped member 48A for forming a temporary swath GL is located leftward of a body 44 of the forward rake unit 43A at a distance from body 44 of the forward rake unit 43A, and a second plate-shaped member 48B for forming the swath GL is located leftward of a body 44 of the rearward rake unit 43B at a distance from the body 44. Grass (cut grass) captured by the rotating rake unit 43A is discharged toward the first plate-shaped member 48A and hits the first plate-shaped member 48A, and the temporary swath GL is formed in the direction of travel of the raking machine 1C. The cut grass in the temporary swath GL is captured by the rotating rake unit 43B, discharged toward the second plate-shaped member 48B, and hits the second plate-shaped member 48B, and the swath GL is formed.

As illustrated in FIG. 1, the rake 3C includes a driver 49 to configure settings of the rake units 43 according to setting information. The setting information is setting information regarding the rake 3C and stored in advance in the controller 15 or the memory 16C. The setting information regarding the rake 3C includes, for example, setting information indicating height position(s) of the rake unit(s) 43 and/or setting information indicating a distance between the two rake units 43 or a distance between the rake unit 43 and the plate-shaped member 48.

The driver 49 includes a first driver 49A that changes the height position(s) of the rake unit(s) 43 and a second driver 49B that changes the distance between the two rake units 43 or the distance between the rake unit 43 and the plate-shaped member 48. The first type 1CA, the second type 1CB, and the third type 1CC each include the first driver 49A and/or the second driver 49B. The first driver 49A is a driving mechanism including actuator(s) and/or cylinder(s), for example, and driven by the controller 15 to raise or lower the body(bodies) 44 and the rotor(s) 45 in the vertical direction, thus changing the height of the rake unit(s) 43 from an agricultural field surface (ground) to the height indicated by the setting information. The first driver 49A may change the height of the rake unit(s) 43 from the agricultural field surface (ground) by raising or lowering gauge wheel(s) 44a supporting the rake unit(s) 43. The first driver 49A can change the height from a reference position (first height) to a different position (second height) that is higher than the reference position, within a predetermined range.

The second driver 49B in the first type 1CA changes the distance between the two rake units 43 in a horizontal direction. The second driver 49B in the second type 1CB changes the distance between the body 44 of the rake unit 43 and the plate-shaped member 48 in the horizontal direction. The second driver 49B in the third type 1CC changes at least the distance between the body 44 of the rake unit 43B and the second plate-shaped member 48B in the horizontal direction. The distance between the body 44 of the rake unit 43A and the first plate-shaped member 48A may be changeable or fixed.

Figure 21A:
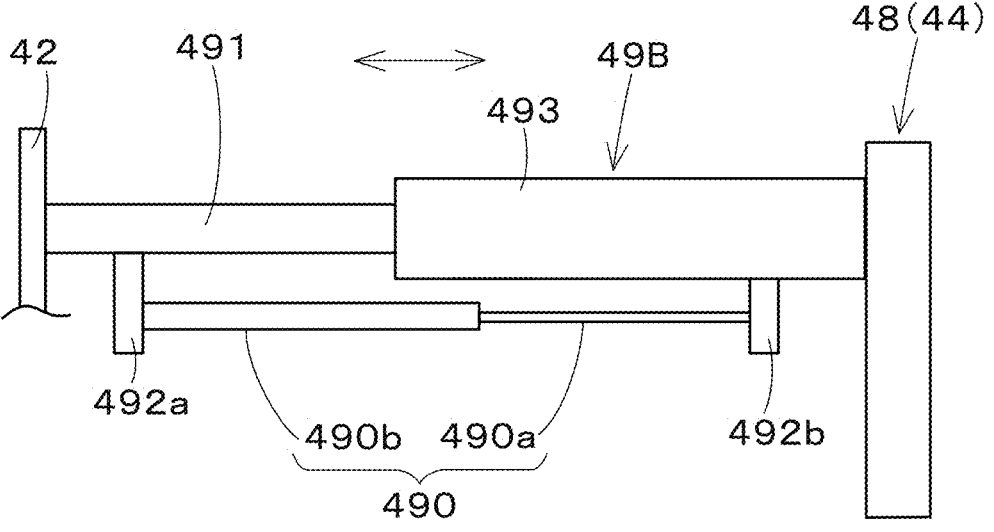
FIG. 21A is a diagram illustrating an example of a second driver.
Figure 21B:
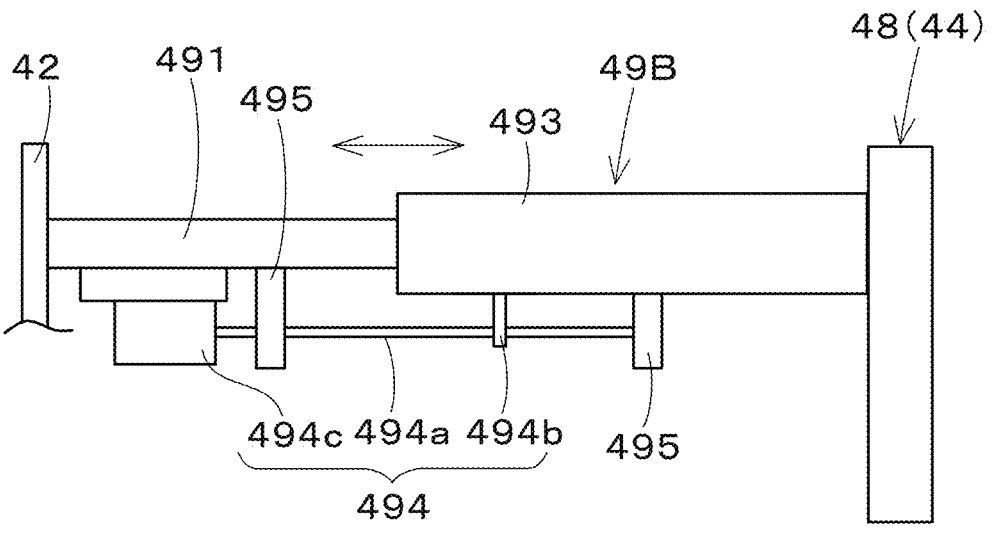
FIG. 21B is a diagram illustrating another example of the second driver.

As illustrated in FIGS. 21A and 21B, the second driver 49B is, for example, a driving mechanism including cylinder(s) and/or actuator(s). FIG. 21A is a diagram illustrating an example of the second driver and illustrates an example where a cylinder 490 changes the position of the plate-shaped member 48. FIG. 21B is a diagram illustrating another example of the second driver and illustrates an example where an actuator (e.g., a feed screw mechanism 494) changes the position of the plate-shaped member 48.

As illustrated in FIG. 21A, the cylinder 490 can be extended and retracted by a medium such as air or hydraulic pressure. A rod 490a is mounted on a third support arm 493 through a bracket 492b, and a tube 490b is mounted on a first support arm 491 which is fixed to the coupling frame 42, through a bracket 492a. As a result, the distance between the rake unit 43 and the plate-shaped member 48 in the horizontal direction can be changed as desired through the extension and retraction of the cylinder 490. When the plate-shaped member 48 illustrated in FIG. 21A is replaced by the body 44 of the rake unit 43, the distance between the coupling frame 42 and the rake unit 43 in the horizontal direction can be changed as desired.

As illustrated in FIG. 21B, the feed screw mechanism 494 includes a feed screw 494a, a mover 494b, and a motor 494c. The feed screw 494a is disposed along the first support arm 491 and the third support arm 493, and the opposite ends thereof are rotatably mounted on the first support arm 491 and the third support arm 493 by bearings 495. The mover 494b is screwed on the feed screw 494a and fixed to the third support arm 493. The motor 494c is fixed to the first support arm 491 and rotates the feed screw 494a. As a result, the feed screw 494a can be advanced by rotating the motor 494c forward and retreated by rotating the motor 494c reverse, thus changing, as desired, the distance between the rake unit 43 and the plate-shaped member 48 in the horizontal direction. When the plate-shaped member 48 illustrated in FIG. 21B is replaced by the body 44 of the rake unit 43, the distance between the coupling frame 42 and the rake unit 43 in the horizontal direction can be changed as desired. The second driver 49B is driven by the controller 15 to change the distance between the two rake units 43 in the horizontal direction or the distance between the rake unit 43 and the plate-shaped member 48 in the horizontal direction to the distance indicated by the setting information. For example, the second driver 49B can change the distance from a reference distance to an increased distance which is larger than the reference distance or a reduced distance which is smaller than the reference distance, within a predetermined range of distance.

As illustrated in FIG. 5, when a machine information field 211 displayed in the setting screen M11 is selected, a machine information obtainer 89 obtains the machine information regarding the raking machine 1C, and the route creator 210 displays the machine information (type information such as the first type 1CA, the second type 1CB, or the third type 1CC and detailed information) regarding the raking machine 1C in a display field 212. When the machine information corresponding to the first type 1CA of the raking machine 1C displayed in the display field 212 is selected, the route creator 210 sets the work width W1A of the first type 1CA as the width for creation of the traveling route R2. When the machine information corresponding to the second type 1CB is selected, the route creator 210 sets the work width W1B of the second type 1CB as the width for creation of the traveling route R2. When the machine information corresponding to the third type 1CC is selected, the route creator 210 sets the work width W1C of the third type 1CC as the width for creation of the traveling route R2.

The following discusses the raking machine 1C. The raking machine 1C includes at least one sensor 17 that obtains the state of grass or a swath GL in an agricultural field. The sensor 17 is, for example, an optical sensor, which is an imager such as a camera, a light detection and ranging (LiDAR), a time-of-flight (ToF) camera, and/or the like. The imager is a charge-coupled device (CCD) camera provided with CCD image sensors or a complementary-metal-oxide semiconductor (CMOS) camera provided with CMOS image sensors. The LiDAR (laser sensor) detects a distance to a target by emitting pulsed infrared light or the like onto the target millions of times per second and measuring the time for the reflected pulsed infrared light to return to the LiDAR. The ToF camera detects a distance to a subject using a ToF of light. In the present preferred embodiment, the sensor 17 is not limited and may be an imager, LiDAR (laser sensor), a ToF camera, or any combination of an imager, LiDAR (laser sensor), and/or a ToF camera may be mounted on the traveling vehicle 2C.

In the present preferred embodiment, the raking machine 1C includes two sensors 17. Specifically, the sensors 17 are imagers and provided at a front position and a rear position of the raking machine 1C. A front camera (second imager) 17A is provided at the front position of the raking machine 1C and captures an image of the state of grass in an agricultural field ahead of the raking machine 1C. A rear camera (first imager) 17B is provided at the rear position of the raking machine 1C and captures an image of the state of the agricultural field behind the raking machine 1C (especially the state of a formed swath GL). The front camera 17A is provided at a front end of the traveling vehicle 2C, but may be provided at any position, such as in the cabin 14, from which the front camera 17A can capture an image of a forward view. The rear camera 17B is provided at a rear end of the rake 3C, but may be provided at any position, such as in the cabin 14 or a position rearward of the traveling vehicle 2C, from which the rear camera 17B can capture an image of a formed swath GL.

When the rake 3C (working device) performs raking, the controller 15 of the raking machine 1C changes the setting information regarding the rake 3C based on the states obtained by the sensors 17. For example, the controller 15 changes the setting information regarding the rake 3C based on imaging data obtained by the front camera 17A and/or imaging data obtained by the rear camera 17B. More specifically, the controller 15 changes the setting information regarding the rake 3C based on imaging data of a work product obtained by the rear camera 17B and indicating the state of a formed swath GL. Alternatively or additionally, the controller 15 changes the setting information regarding the rake 3C based on pre-work imaging data obtained by the front camera 17A before raking is performed and indicating the state of grass in an agricultural field.

More specifically, the controller 15 changes setting information indicating a clearance between a plate-shaped member 48 and a rake unit 43 based on imaging data of a work product obtained by the rear camera 17B. The controller 15 changes the setting information indicating the clearance between the plate-shaped member 48 and the rake unit 43 based on pre-work imaging data obtained by the front camera 17A.

As illustrated in FIGS. 7 to 10, the memory 16C includes first to fourth data tables TB1 to TB4. The first data table TB1 illustrated in FIG. 7 stores correspondences between imaging data obtained by the front camera 17A, imaging data obtained by the rear camera 17B, and setting information indicating the position of the plate-shaped member (swath curtain) 48. More specifically, the first data table TB1 stores first setting information indicating that if the amount of grass indicated by the imaging data obtained by the front camera 17A is larger than or equal to a first upper limit value (large) or if the width (swath width) of a swath GL indicated by the imaging data obtained by the rear camera 17B is smaller than or equal to a first lower limit width (small), the plate-shaped member (swath curtain) 48 is pulled out to achieve the increased distance. The first data table TB1 also stores second setting information indicating that if the amount of grass indicated by the imaging data obtained by the front camera 17A is smaller than or equal to a first lower limit value (small) or if the width (swath width) of the swath GL indicated by the imaging data obtained by the rear camera 17B is larger than or equal to a first upper limit width (large) or if the swath GL indicated by the imaging data obtained by the rear camera 17B has a two-pile shape (a shape of two piles), the plate-shaped member 48 is pushed inward to achieve the reduced distance.

The second data table TB2 illustrated in FIG. 8 stores correspondences between imaging data obtained by the front camera 17A and setting information indicating height of the rake unit 43, that is, height of the tines 47. More specifically, the second data table TB2 stores setting information indicating that if a captured image indicated by the imaging data obtained by the front camera 17A is a first feature image (if the state of grass is normal and an agricultural field is flat), the height of the tines 47 is set at the reference position (first height). The second data table TB2 also stores setting information indicating that if the captured image indicated by the imaging data obtained by the front camera 17A is a second feature image (if the state of grass is weak or soft) or a third feature image (if an agricultural field is not flat or is uneven), the height of the tines 47 is set at the different position (second height) which is higher than the reference position (first height).

The third data table TB3 illustrated in FIG. 9 stores correspondences between imaging data obtained by the front camera 17A and the setting information indicating the travel speed of the traveling vehicle 2C. More specifically, the third data table TB3 stores setting information indicating that if the amount of grass indicated by the imaging data obtained by the front camera 17A is larger than or equal to a first upper limit value (large) or if a captured image indicated by the imaging data obtained by the front camera 17A is a third feature image (if an agricultural field is not flat or is uneven), the travel speed of the traveling vehicle 2C is set at a first speed which is lower than a predetermined specified speed. The third data table TB3 also stores setting information indicating that if the amount of grass indicated by the imaging data obtained by the front camera 17A is smaller than or equal to the first lower limit value (small), the travel speed of the traveling vehicle 2C is set at a second speed which is higher than the predetermined specified speed.

The fourth data table TB4 illustrated in FIG. 10 stores correspondences between imaging data obtained by the rear camera 17B and the setting information indicating the rotation speed of the PTO shaft AX. More specifically, the fourth data table TB4 stores setting information indicating that if a captured image indicated by the imaging data obtained by the rear camera 17B is a fourth feature image (if the swath GL is triangular and hard), the rotation speed of the PTO shaft AX is set at a first rotation speed which is lower than a predetermined specified speed. The fourth data table TB4 also stores setting information indicating that if the captured image indicated by the imaging data obtained by the rear camera 17B is a third feature image (if an agricultural field is uneven), the rotation speed of the PTO shaft AX is set at a second rotation speed which is higher than the predetermined specified speed.

The memory 16C may include at least one of the first to fourth data tables TB1 to TB4.

As illustrated in FIG. 1, the traveling vehicle 2C of the raking machine 1C includes a PTO transmission 41 that changes the rotation speed of the PTO shaft AX under control of the controller 15. That is, the PTO transmission 41 changes the rotation speed of the PTO shaft AX, which is driven by power from the prime mover 11, to a desired rotation speed.

The controller 15 of the raking machine 1C can set a plurality of adjustment modes for the raking in accordance with, for example, an operation instruction from an operator to a display 4C. The adjustment modes include first to fourth adjustment modes. In the first adjustment mode, a more appropriate swath GL is formed by adjusting the position of the plate-shaped member (swath curtain) 48 defining the distance to the body 44 using the first data table TB1. In the second adjustment mode, a more appropriate swath GL is formed by automatically adjusting the height of the rake unit(s) 43 using the second data table TB2. In the third adjustment mode, a more appropriate swath GL is formed by automatically adjusting the travel speed of the traveling vehicle 2C using the third data table TB3. In the fourth adjustment mode, a more appropriate swath GL is formed by automatically adjusting the rotation speed of the PTO shaft AX using the fourth data table TB4. The display 4C displays icons corresponding to the first to fourth adjustment modes such that one of the icons that corresponds to a selected one of the first to fourth adjustment modes is highlighted and the other icons corresponding to unselected modes are not highlighted. The operator, therefore, can visually recognize the selected adjustment mode by looking at the icons on the display 4C.

Figure 13:
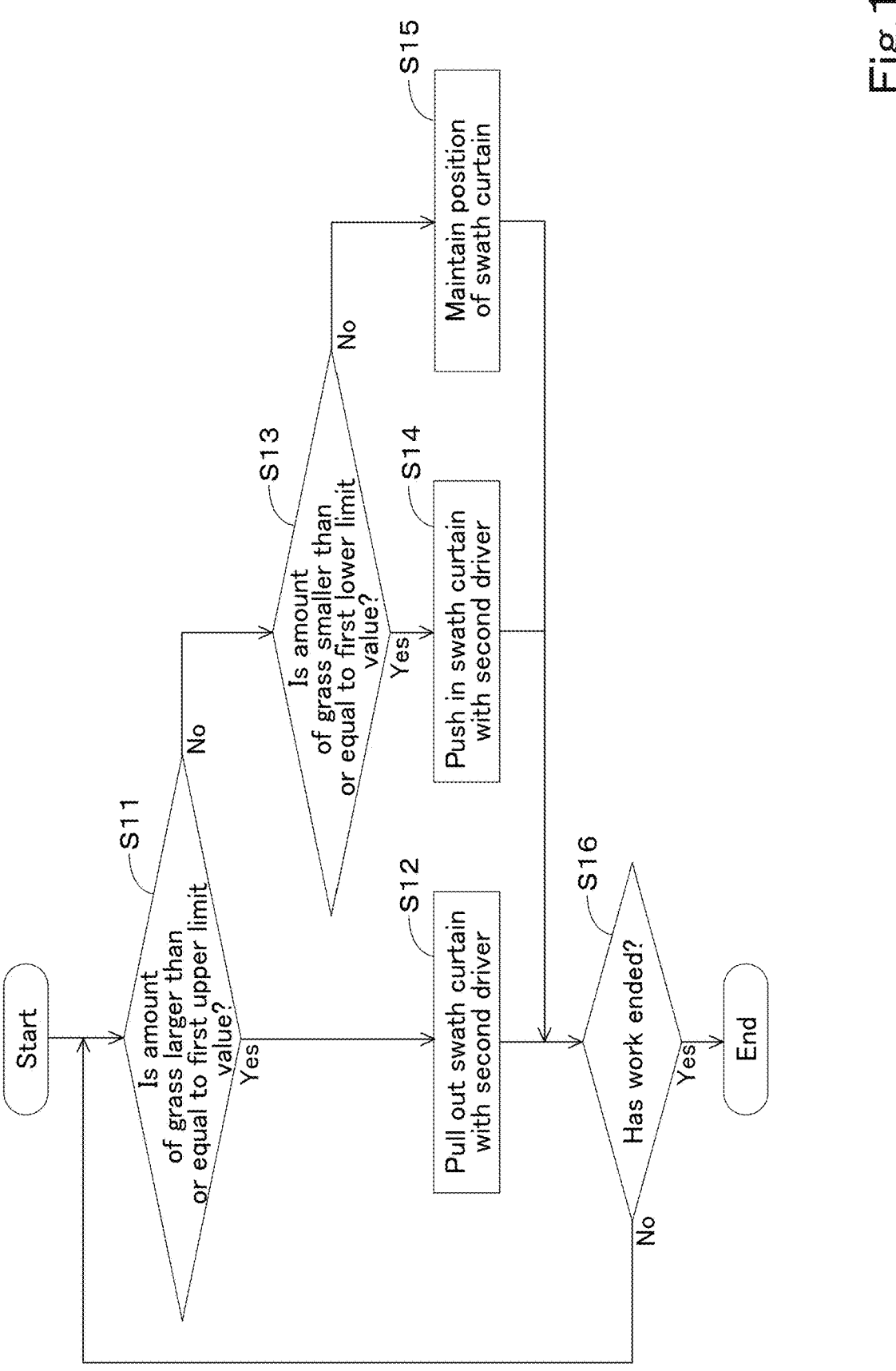
FIG. 13 is a flowchart illustrating a control process where the position of a swath curtain defining distance is controlled based on imaging data obtained by a front camera.
Figure 14:
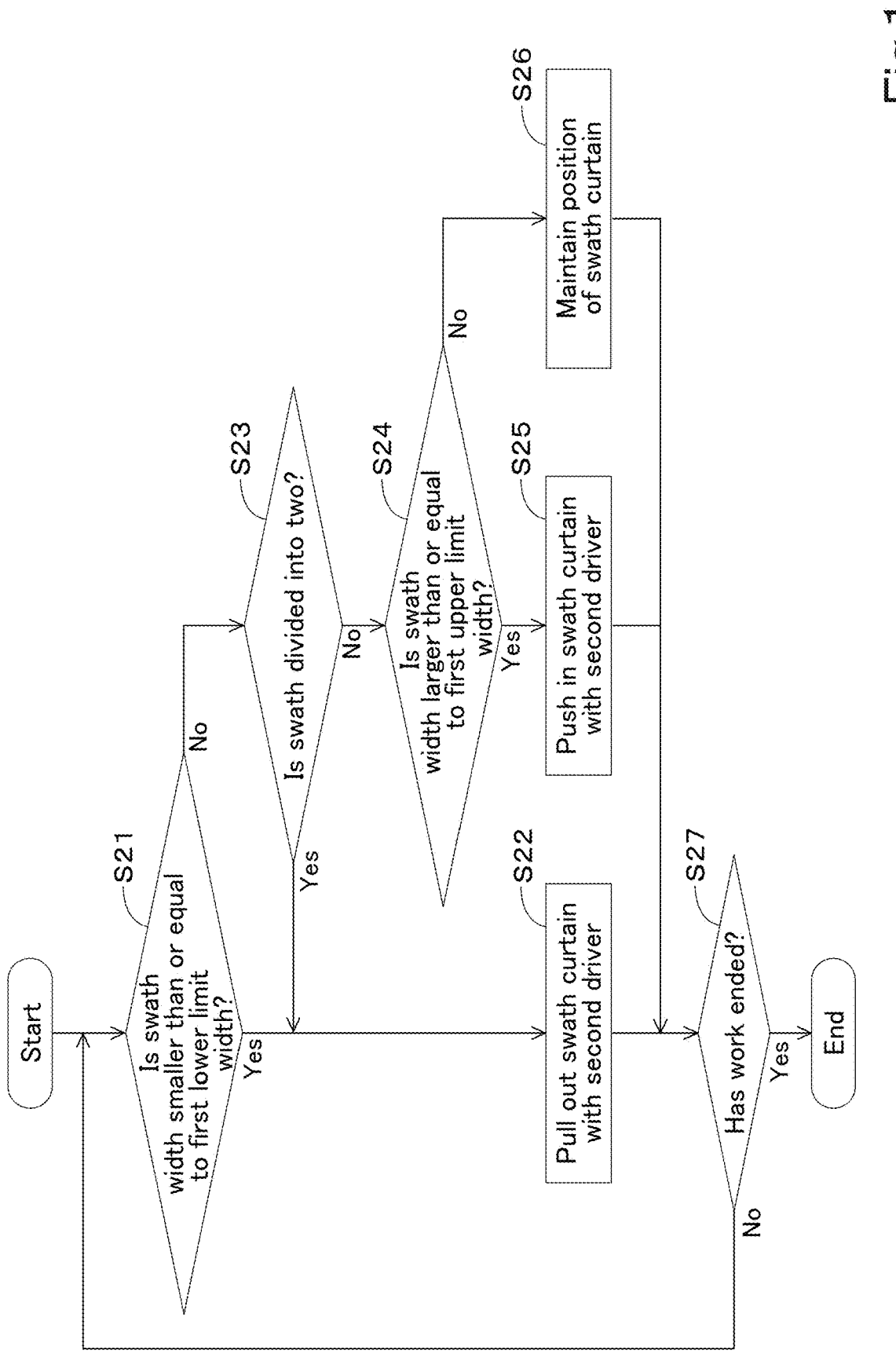
FIG. 14 is a flowchart illustrating a control process where the position of the swath curtain defining distance is controlled based on imaging data obtained by a rear camera.

The following description discusses a control process performed by the controller 15 when raking is performed by the raking machine 1C, with reference to FIGS. 13 and 14. FIG. 13 is a flowchart illustrating a control process by which the position of the plate-shaped member (swath curtain) 48 defining the distance is controlled based on imaging data obtained by the front camera 17A. FIG. 14 is a flowchart illustrating a control process by which the position of the plate-shaped member (swath curtain) 48 defining the distance is controlled based on imaging data obtained by the rear camera 17B. It is assumed here that the raking machine 1C is of the second type 1CB illustrated in FIG. 6 and the first adjustment mode has been selected in accordance with an operation instruction from the operator to the display 4C.

Figure 11:
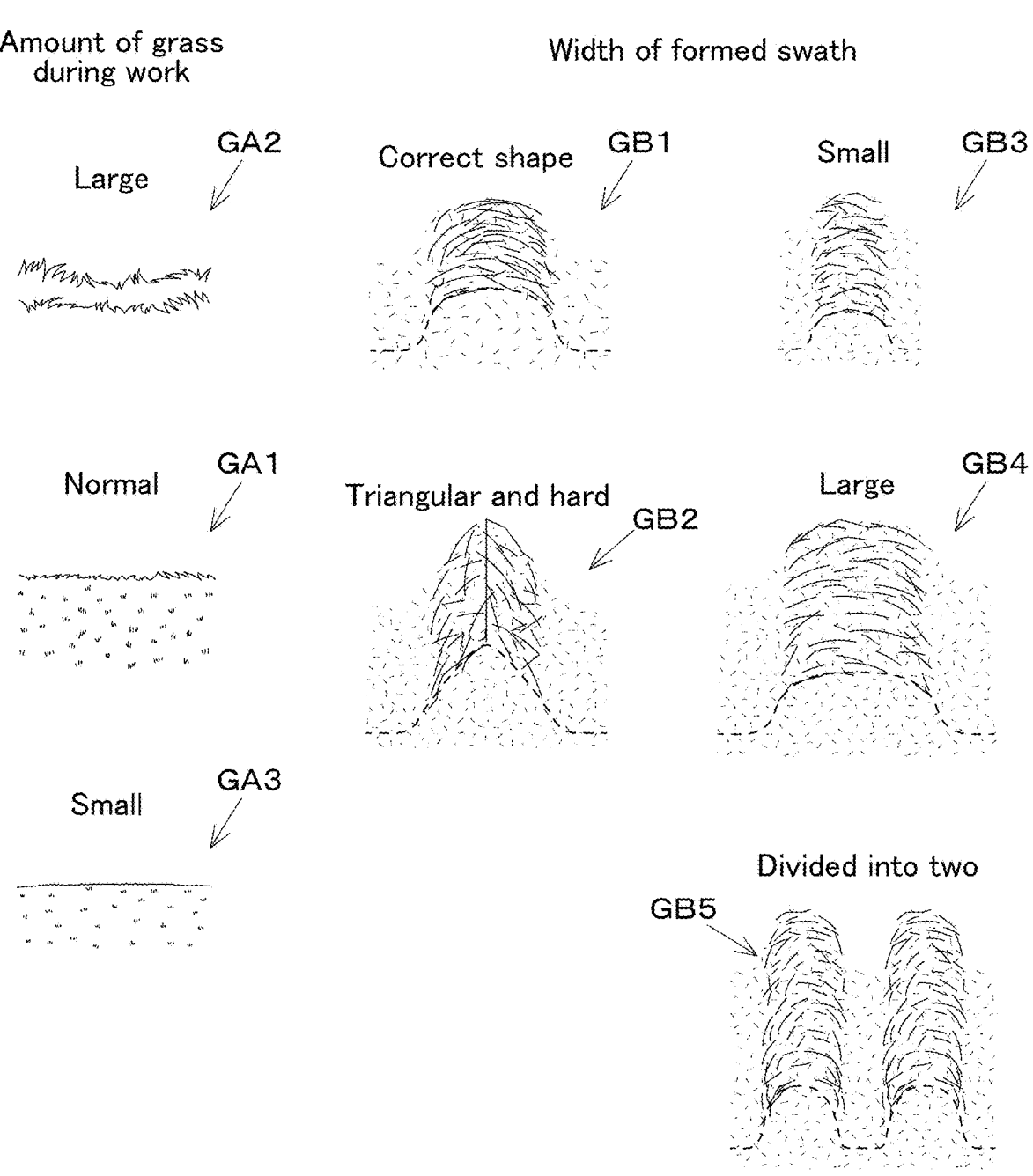
FIG. 11 is a diagram illustrating an example of images of grass or swaths.

The following first discusses the flowchart of FIG. 13. When a manipulator provided near the operator's seat of the traveling vehicle 2C is operated or when raking is started using the display 4C, a switch, or the like provided near the operator's seat, the controller 15 determines, using the first data table TB1 illustrated in FIG. 7, whether the amount of grass indicated by the imaging data obtained by the front camera 17A is larger than or equal to the first upper limit value (S11). For example, if the controller 15 performs an image analysis on the imaging data (captured image) obtained by the front camera 17A and determines that the amount of grass in the captured image is larger than or equal to the first upper limit value or if the controller 15 performs pattern matching between the captured image and images-for-determination of a plurality of types stored in the memory 16C in advance and determines that the captured image is the same as or similar to an image-for-determination corresponding to the first upper limit value or larger, for example, the controller 15 determines that the amount of grass is larger than or equal to the first upper limit value (YES in S11). As illustrated in FIG. 11, for example, an image GA1 is an example of an image when the amount of grass is normal (appropriate). An image GA2 is an example of an image when the amount of grass is large. An image GA3 is an example of an image when the amount of grass is small.

If the controller 15 determines that the amount of grass is larger than or equal to the first upper limit value (YES in S11), the controller 15 changes the setting information indicating the clearance between the plate-shaped member 48 and the rake unit 43 to the first setting information stored in the first data table TB1 illustrated in FIG. 7 to pull out the plate-shaped member (swath curtain) 48 with the second driver 49B and achieve the increased distance indicated by the first setting information (S12). Specifically, the controller 15 extends the cylinder 490 in the case of the second driver 49B illustrated in FIG. 21A or advances the feed screw 494a by rotating the motor 494c of the feed screw mechanism 494 forward in the case of the second driver 49B illustrated in FIG. 21B to pull out the plate-shaped member (swath curtain) 48. Note that, if the controller 15 determines that the amount of grass is larger than or equal to the first upper limit value (YES in S11), the controller 15 may increase the clearance between the plate-shaped member 48 and the rake units 43 in accordance with an amount by which the first upper limit value is exceeded. That is, the increased distance may increase according to how much the first upper limit value is exceeded.

If the controller 15 determines that the amount of grass is not larger than or equal to the first upper limit value (NO in S11), on the other hand, the controller 15 determines whether the amount of grass indicated by the imaging data obtained by the front camera 17A is smaller than or equal to the first lower limit value (S13). If the controller 15 performs an image analysis on the imaging data (captured image) obtained by the front camera 17A and determines that the amount of grass in the captured image is smaller than or equal to the first lower limit value or if the controller 15 performs pattern matching between the captured image and the images-for-determination of the plurality of types stored in the memory 16C in advance and determines that the captured image is the same as or similar to an image-for-determination corresponding to the first lower limit value or smaller, for example, the controller 15 determines that the amount of grass is smaller than or equal to the first lower limit value (YES in S13). If the controller 15 determines that the amount of grass is smaller than or equal to the first lower limit value (YES in S13), the controller 15 changes the setting information indicating the clearance between the plate-shaped member 48 and the rake unit 43 to the second setting information stored in the first data table TB1 illustrated in FIG. 7 to push inward the plate-shaped member (swath curtain) 48 with the second driver 49B and achieve the reduced distance indicated by the second setting information (S14). Specifically, the controller 15 retracts the cylinder 490 in the case of the second driver 49B illustrated in FIG. 21A or retreats the feed screw 494a by rotating the motor 494c of the feed screw mechanism 494 reverse in the case of the second driver 49B illustrated in FIG. 21B to push the plate-shaped member (swath curtain) 48 inward. Note that, if the controller 15 determines that the amount of grass is smaller than or equal to the first lower limit value (YES in S13), the controller 15 may reduce the clearance between the plate-shaped member 48 and the rake unit 43 in accordance with an amount by which the clearance is short of the first lower limit value That is, the reduced distance may decrease according to how much the clearance is short of the first lower limit.

If the controller 15 determines that the amount of grass is not smaller than or equal to the first lower limit value (NO in S13), on the other hand, the controller 15 uses the current setting information indicating the clearance between the plate-shaped member 48 and the rake unit 43 to maintain the clearance between the plate-shaped member (swath curtain) 48 and the rake unit 43 (S15).

After S12, S14, or S15, the controller 15 determines whether the work has ended (S16). For example, if the controller 15 receives an instruction to end raking from an operator (YES in S16), the controller 15 ends the process. If there is no instruction to end the raking from the operator (NO in S16), the controller 15 returns to step S11.

That is, as illustrated in FIG. 11, for example, if a captured image is the image GA2, the controller 15 increases the clearance defined by the plate-shaped member 48 (swath curtain) since the amount of grass is large. If a captured image is the image GA3, the controller 15 reduces the clearance defined by the plate-shaped member 48 since the amount of grass is small. If a captured image is the image GA1, the controller 15 sets the clearance of the plate-shaped member 48 at a normal clearance since the amount of grass is appropriate.

Note that, the controller 15 may make the determination in S11 illustrated in FIG. 13 based on a start of transmission of power to the rake 3C from the PTO shaft AX or a start of driving of the rake units 43 and determine that the work has ended (YES in S16) based on an end of the transmission of power to the rake 3C from the PTO shaft AX or an end of the driving of the rake unit 43.

Next, the following discusses the flowchart of FIG. 14. The controller 15 determines, using the first data table TB1 illustrated in FIG. 7, whether the width (swath width) of a swath GL indicated by the imaging data obtained by the rear camera 17B is smaller than or equal to the first lower limit width (S21). If the controller 15 performs an image analysis on the imaging data (captured image) obtained by the rear camera 17B and determines that the width (swath width) of the swath GL in the captured image is smaller than or equal to the first lower limit width or if the controller 15 performs pattern matching between the captured image and the images-for-determination of the plurality of types stored in the memory 16C in advance and determines that the captured image is the same as or similar to an image-for-determination corresponding to the first lower limit width or smaller, for example, the controller 15 determines that the width of the swath GL is smaller than or equal to the first lower limit width (YES in S21).

As illustrated in FIG. 12, for example, an image GB1 is an example of an image when the swath GL has a correct shape. An image GB2 is an example of an image when the swath GL is triangular and hard. An image GB3 is an example of an image when the width of the swath GL is small. An image GB4 is an example of an image when the width of the swath GL is large. An image GB5 is an example of an image when the swath GL has a two-pile shape. Since the raking machine 1C is of the second type 1CB illustrated in FIG. 6 and the rear camera 17B and the plate-shaped member (swath curtain) 48 are arranged in the width direction with a space therebetween, the swath GL extends diagonally in an image captured by the rear camera 17B as illustrated in FIG. 12.

If the controller 15 determines that the width of the swath GL is smaller than or equal to the first lower limit width (YES in S21), the controller 15 changes the setting information indicating the clearance between the plate-shaped member 48 and the rake unit 43 to the first setting information stored in the first data table TB1 illustrated in FIG. 7 to pull out the plate-shaped member 48 (swath curtain) with the second driver 49B and achieve the increased distance indicated by the first setting information (S22). More specifically, the controller 15 extends the cylinder 490 in the case of the second driver 49B illustrated in FIG. 21A or advances the feed screw 494a by rotating the motor 494c of the feed screw mechanism 494 forward in the case of the second driver 49B illustrated in FIG. 21B to pull out the plate-shaped member (swath curtain) 48. If the controller 15 determines that the width of the swath GL is smaller than or equal to the first lower limit width (YES in S21), the controller 15 may increase the clearance between the plate-shaped member 48 and the rake unit 43 in accordance with an amount by which the width is short of the first lower limit width.

If the controller 15 determines that the width of the swath GL is not smaller than or equal to the first lower limit width (NO in S21), on the other hand, the controller 15 determines whether the swath GL indicated by the imaging data obtained by the rear camera 17B has a two-pile shape (S23). If the controller 15 performs an image analysis on the imaging data (captured image) obtained by the rear camera 17B and determines that the swath GL in the captured image has a two-pile shape or if the controller 15 performs pattern matching between the captured image and the images-for-determination of the plurality of types stored in the memory 16C in advance and determines that the captured image is the same as or similar to an image-for-determination corresponding to a swath GL having a two-pile shape, for example, the controller 15 determines that the swath GL has a two-pile shape (YES in S23).

If the controller 15 determines that the swath GL does not have a two-pile shape (NO in S23), on the other hand, the controller 15 determines whether the width of the swath GL is larger than or equal to the first upper limit width (S24). If the controller 15 performs an image analysis on the imaging data (captured image) obtained by the rear camera 17B and determines that the width of the swath GL in the captured image is larger than or equal to the first upper limit width or if the controller 15 performs pattern matching between the captured image and the images-for-determination of the plurality of types stored in the memory 16C in advance and determines that the captured image is the same as or similar to an image-for-determination corresponding to width of a swath GL being larger than or equal to the first upper limit width, for example, the controller 15 determines that the width of the swath GL is larger than or equal to the first upper limit width (YES in S24). If the controller 15 determines that the width of the swath GL is larger than or equal to the first upper limit width (YES in S24) or that the swath GL has a two-pile shape (YES in S23), the controller 15 changes the setting information indicating the clearance between the plate-shaped member 48 and the rake unit 43 to the second setting information stored in the first data table TB1 illustrated in FIG. 7 to push inward the plate-shaped member (swath curtain) 48 with the second driver 49B and achieve the reduced distance indicated by the second setting information (S25). More specifically, the controller 15 retracts the cylinder 490 in the case of the second driver 49B illustrated in FIG. 21A or retreats the feed screw 494a by rotating the motor 494c of the feed screw mechanism 494 reverse in the case of the second driver 49B illustrated in FIG. 21B to push inward the plate-shaped member (swath curtain) 48. If the controller 15 determines that the width of the swath GL is larger than or equal to the first upper limit width (YES in S24), the controller 15 may reduce the clearance between the plate-shaped member 48 and the rake unit 43 in accordance with an amount by which the width is short of the first upper limit width.

If the controller 15 determines that the width of the swath GL is not smaller than or equal to the first lower limit width (NO in S24), on the other hand, the controller 15 uses the current setting information indicating the clearance between the plate-shaped member 48 and the rake unit 43 to maintain the clearance between the plate-shaped member (swath curtain) 48 and the rake unit 43 (S26).

After S22, S25, or S26, the controller 15 determines whether the work has ended (S27). If the controller 15 receives an instruction to end the raking from the operator (YES in S27), for example, the controller 15 ends the process. If there is no instruction to end the raking from the operator (NO in S27), the controller 15 returns to step S21.

That is, as illustrated in FIG. 12, for example, if a captured image is the image GB3, the controller 15 increases the clearance of the plate-shaped member 48 (swath curtain) since a width of a swath GL is small. If a captured image is the image GB4, the controller 15 reduces the clearance of the plate-shaped member 48 since a width of a swath GL is large. If a captured image is the image GB5, the controller 15 reduces the clearance of the plate-shaped member 48 since a swath GL has a two-pile shape. If a captured image is the image GB1, the controller 15 sets the clearance of the plate-shaped member 48 at a normal clearance since the amount of grass is appropriate.

Although FIGS. 13 and 14 illustrate examples where the raking machine 1C is of the second type 1CB, the raking machine 1C may be of the first type 1CA, the third type 1CC, or another type.

Figure 15:
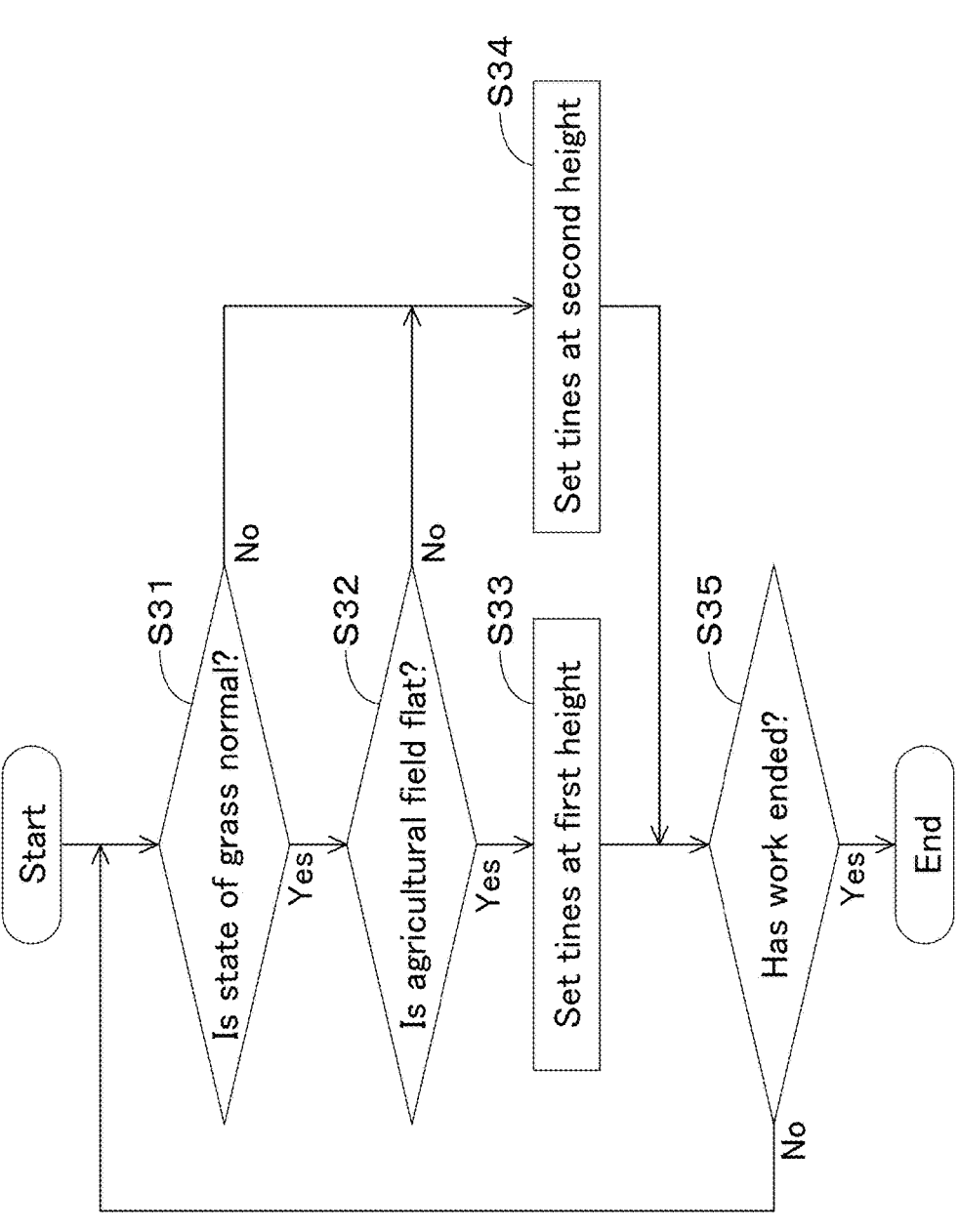
FIG. 15 is a flowchart illustrating a control process where height of tines is controlled based on imaging data obtained by the front camera.

Next, a control process performed by the controller 15 when raking is performed by the raking machine 1C will be described with reference to FIG. 15. FIG. 15 is a flowchart illustrating a control process by which the height of the tines is controlled based on imaging data obtained by the front camera 17A. It is assumed here that the raking machine 1C is of the first type 1CA illustrated in FIG. 6 and the second adjustment mode has been selected in accordance with an operation instruction from the operator to the display 4C.

When raking (i.e., creation of a swath GL) starts based on an instruction to start the raking from the operator, the controller 15 determines, using the second data table TB2 illustrated in FIG. 8, whether the state of grass indicated by the imaging data obtained by the front camera 17A is normal (S31). If the controller 15 performs an image analysis on the imaging data (captured image) obtained by the front camera 17A and determines that a captured image is the first feature image which indicates that the state of grass is normal or if the controller 15 performs pattern matching between the captured image and the images-for-determination of the plurality of types stored in the memory 16C in advance and determines that the captured image is the same as or similar to an image-for-determination corresponding to the first feature image, for example, the controller 15 determines that the state of grass is normal (YES in S31). As illustrated in FIG. 11, for example, the image GA1 is an example of an image when the amount of grass is normal. The image GA2 is an example of an image when the amount of grass is large. The image GA3 is an example of an image when the amount of grass is small. Since the raking machine 1C is of the first type 1CA illustrated in FIG. 6 here and the rear camera 17B and the two rake units 43 are positioned such that the rear camera 17B is aligned with the center of the clearance between the rake units 43, the image captured by the rear camera 17B is an image showing the swath GL at the center as illustrated in FIG. 11.

If the controller 15 determines that the state of grass is normal (YES in S31), the controller 15 determines whether an agricultural field is flat (S32). If the controller 15 performs an image analysis on the imaging data (captured image) obtained by the front camera 17A and determines that the captured image is the first feature image which indicates that the agricultural field is flat or if controller 15 performs pattern matching between the captured image and the images-for-determination of the plurality of types stored in the memory 16C in advance and determines that the captured image is the same as or similar to the image-for-determination corresponding to the first feature image, the controller 15 determines that the agricultural field is flat (YES in S32). If the controller 15 determines that the state of grass is normal (YES in S31) and that the agricultural field is flat (YES in S32), the controller 15 changes setting information indicating the height of the rake units 43 from the agricultural field surface (ground) to third setting information of the second data table TB2, so that the height of the rake units 43 is set to the first height by the first driver 49A (S33). For example, the first height may be a predetermined standard height closest to the agricultural field surface or any other desired height.

If the controller 15 determines that the state of grass is not normal (NO in S31) or that the agricultural field is not flat (NO in S32), on the other hand, the controller 15 changes the setting information indicating the height of the rake units 43 from the agricultural field surface (ground) to fourth setting information of the second data table TB2, so that the height of the rake units 43 is changed to a second height which is greater than the first height by the first driver 49A (S34). If the controller 15 performs an image analysis on the imaging data (captured image) obtained by the front camera 17A and determines that the captured image is the third feature image which indicates that the agricultural field is not flat or if the controller 15 performs pattern matching between the captured image and the images-for-determination of the plurality of types stored in the memory 16C in advance and determines that the captured image is the same as or similar to an image-for-determination corresponding to the third feature image, the controller 15 may determine that the agricultural field is not flat (NO in S32). Furthermore, the controller 15 may receive, from the assistor 84, positional information (topographic information) regarding places in the agricultural field detected by the position detector 60B in tedding (tedding step) cut grass in the agricultural field performed by the tedding machine 1B and determine, based on the topographic information or using the topographic information as supplementary information, whether the agricultural field is flat.

After S33 or S34, the controller 15 determines whether the work has ended (S35). If receiving an instruction to end the raking from the operator (YES in S35), for example, the controller 15 ends the process. If there is no instruction to end the raking from the operator (NO in S35), the controller 15 returns to step S31.

Figure 16:
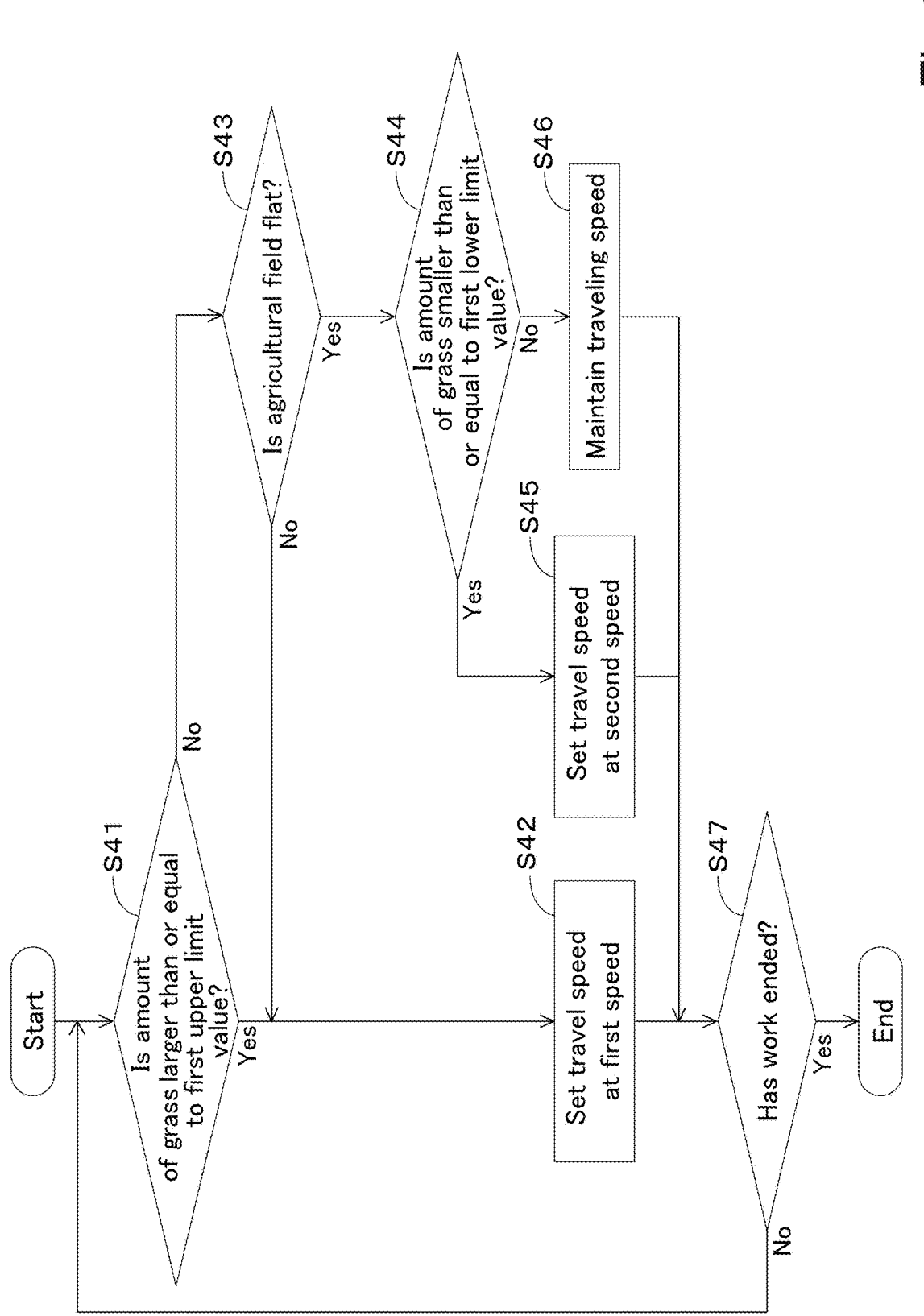
FIG. 16 is a flowchart illustrating a control process where travel speed is controlled based on imaging data obtained by the front camera.

Next, the following discusses a flowchart of FIG. 16. FIG. 16 is a flowchart illustrating a control process by which travel speed is controlled based on imaging data obtained by the front camera 17A. It is assumed here that the raking machine 1C is of the second type 1CB illustrated in FIG. 6 and the third adjustment mode has been selected in accordance with an operation instruction from the operator to the display 4C.

When raking starts based on an instruction to start the raking from the operator, the controller 15 determines, using the third data table TB3 illustrated in FIG. 9, whether the amount of grass indicated by the imaging data obtained by the front camera 17A is larger than or equal to the first upper limit value (S41). If the controller 15 performs an image analysis on the imaging data (captured image) obtained by the front camera 17A and determines that the amount of grass in the captured image is larger than or equal to the first upper limit value or if the controller performs pattern matching between the captured image and the images-for-determination of the plurality of types stored in the memory 16C in advance and determines that the captured image is the same as or similar to the image-for-determination corresponding to the first upper limit value or larger, for example, the controller 15 determines that the amount of grass is larger than or equal to the first upper limit value (YES in S41).

If the controller 15 determines that the amount of grass is larger than or equal to the first upper limit value (YES in S41), the controller 15 changes the setting information indicating the travel speed of the traveling vehicle 2C to the setting information indicating the first speeds stored in the third data table TB3 illustrated in FIG. 9, so that the travel speed of the traveling vehicle 2C is set at the first speed (S42). The controller 15 sets the travel speed of the traveling vehicle 2C at the first speed by controlling the prime mover 11 and the transmission 12. Note that, if the controller 15 determines that the amount of grass is larger than or equal to the first upper limit value (YES in S41), the controller 15 may reduce the first speed of the traveling vehicle 2C in accordance with an amount by which the first upper limit value is exceeded. That is, the first speed of the traveling vehicle 2C decreases as the amount of grass becomes larger.

If the controller 15 determines that the amount of grass is not larger than or equal to the first upper limit value (NO in S41), on the other hand, the controller 15 determines whether the state of the agricultural field indicated by the imaging data obtained by the front camera 17A is flat (S43). If the controller 15 performs an image analysis on the imaging data (captured image) obtained by the front camera 17A and determines that the state of the agricultural field in the captured image is flat or if the controller 15 performs pattern matching between the captured image and the images-for-determination of the plurality of types stored in the memory 16C in advance and determines that the captured image is the same as or similar to an image-for-determination indicating a flat agricultural field, for example, the controller 15 determines that the state of the agricultural field is flat (YES in S43). If the controller 15 determines that the state of the agricultural field is not flat (NO in S43), the controller 15 changes the setting information indicating the travel speed of the traveling vehicle 2C to the setting information indicating the first speed stored in the third data table TB3 illustrated in FIG. 9, so that the travel speed of the traveling vehicle 2C is at the first speed (S42). The controller 15 sets the travel speed of the traveling vehicle 2C at the second speed by controlling the prime mover 11 and the transmission 12.

If the controller 15 determines in S43 that the state of the agricultural field is flat (YES in S43), on the other hand, the controller 15 determines whether the amount of grass indicated by the imaging data obtained by the front camera 17A is smaller than or equal to the first lower limit value (S44). If the controller 15 performs an image analysis on the imaging data (captured image) obtained by the front camera 17A and determines that the amount of grass in the captured image is smaller than or equal to the first lower limit value or if the controller 15 performs pattern matching between the captured image and the images-for-determination of the plurality of types stored in the memory 16C in advance and determines that the captured image is the same as or similar to the image-for-determination corresponding to the first lower limit value or smaller, for example, the controller 15 determines that the amount of grass is smaller than or equal to the first lower limit value (YES in S44). If the controller determines that the amount of grass is smaller than or equal to the first lower limit value (YES in S44), the controller 15 changes the setting information indicating the travel speed of the traveling vehicle 2C to the setting information indicating the second speed stored in the third data table TB3 illustrated in FIG. 9 to set the travel speed of the traveling vehicle 2C at the second speed (S45).

If the controller 15 determines that the amount of grass is not smaller than or equal to the first lower limit value (NO in S44), the controller 15 maintains the current setting information indicating the travel speed of the traveling vehicle 2C (S46).

Next, after S42, S45, or S46, the controller 15 determines whether the work has ended (S47). If receiving an instruction to end the raking from the operator (YES in S47), for example, the controller 15 ends the process. If there is no instruction to end the raking from the operator (NO in S47), the controller 15 returns to step S41.

That is, if the controller 15 determines that the captured image is the image GA2 (i.e., if the amount of grass is large) or that the agricultural field is not flat (is uneven), the controller 15 changes (reduces) the travel speed of the traveling vehicle 2C to the first speed. If the controller 15 determines that the captured image is the image GA3 (i.e., if the amount of grass is small), the controller 15 changes (increases) the travel speed of the traveling vehicle 2C to the second speed. If the controller 15 determines that the captured image is the image GA1 (i.e., if the amount of grass is normal), the controller 15 maintains the current travel speed of the traveling vehicle 2C.

Figure 17:
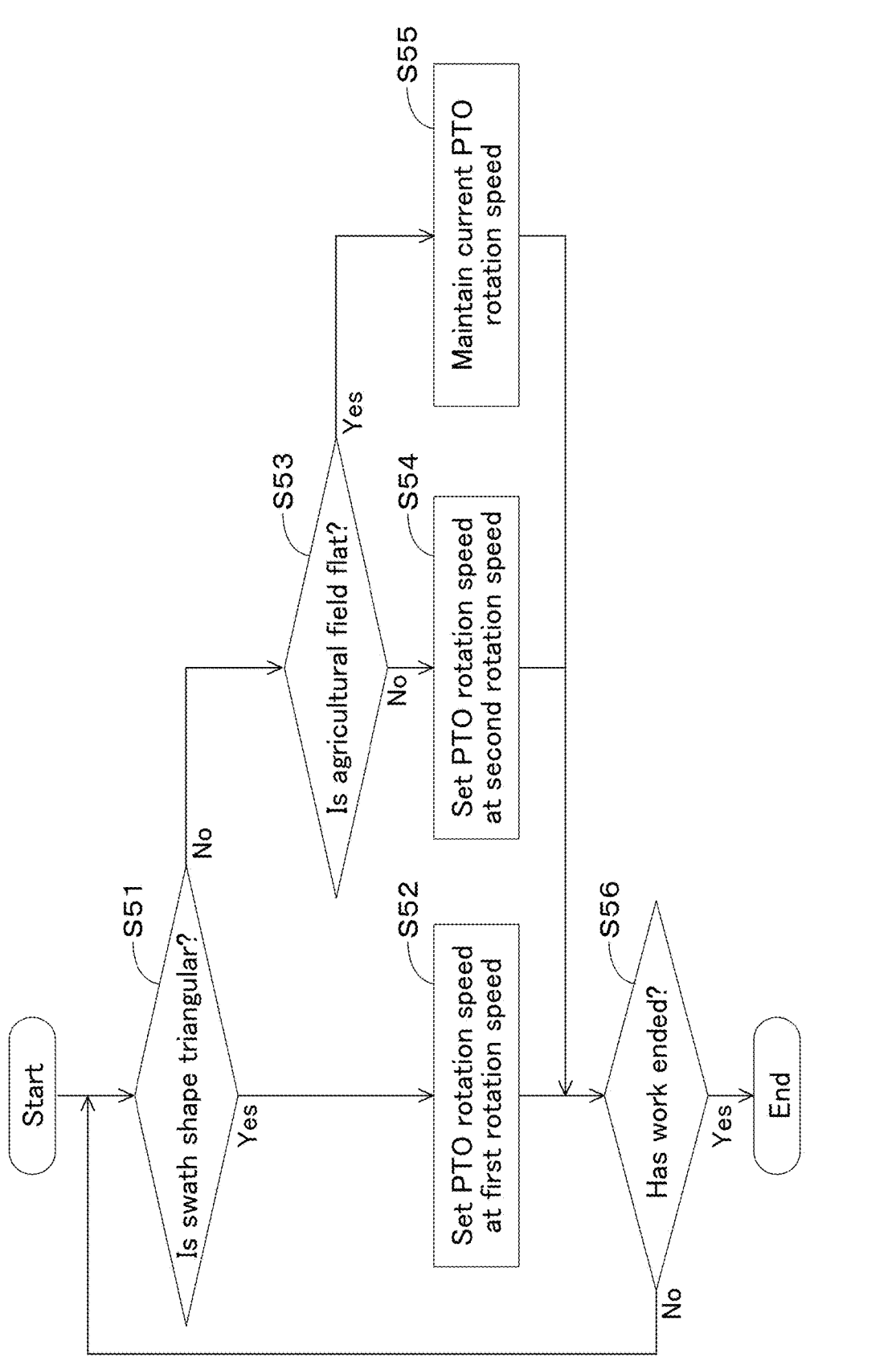
FIG. 17 is a flowchart illustrating a control process where rotation speed of a power take-off (PTO) shaft is controlled based on imaging data obtained by the front camera and imaging data obtained by the rear camera.

Next, the following discusses a flowchart of FIG. 17. FIG. 17 is a flowchart illustrating a control process by which the rotation speed of the PTO shaft AX is controlled based on imaging data obtained by the front camera 17A and imaging data obtained by the rear camera 17B. It is assumed here that the raking machine 1C is of the first type 1CA illustrated in FIG. 6 and the fourth adjustment mode has been selected in accordance with an operation instruction from the operator to the display 4C.

When raking starts based on an instruction to start the raking from the operator, the controller 15 determines, using the fourth data table TB4 illustrated in FIG. 10, whether a captured image indicated by the imaging data obtained by the rear camera 17B is the fourth feature image (a swath GL is triangular and hard) (S51). If the controller 15 performs an image analysis on the imaging data (captured image) obtained by the rear camera 17B and determines that the swath GL in the captured image is triangular and hard or if the controller 15 performs pattern matching between the captured image and the images-for-determination of the plurality of types stored in the memory 16C in advance and determines that the captured image is the same as or similar to an image-for-determination corresponding to the swath GL being triangular and hard, for example, the controller 15 determines that the captured image is the fourth feature image (YES in S51).

If the controller 15 determines that the imaging data (captured image) obtained by the rear camera 17B is the fourth feature image (YES in S51), the controller 15 changes setting information indicating the rotation speed of the PTO shaft AX to the setting information indicating the first rotation speed stored in the fourth data table TB4 illustrated in FIG. 10, so that the rotation speed of the PTO shaft AX is set at the first rotation speed (S52). The controller 15 changes the rotation speed of the PTO shaft AX at the first rotation speed with the PTO transmission 41 by controlling the PTO transmission 41.

If the controller 15 determines that the imaging data (captured image) obtained by the rear camera 17B is not the fourth feature image (NO in S51), on the other hand, the controller 15 determines whether the state of the agricultural field indicated by the imaging data obtained by the front camera 17A is flat (S53). If the controller 15 performs an image analysis on the imaging data (captured image) obtained by the front camera 17A and determines that the state of the agricultural field in the captured image is flat or if the controller 15 performs pattern matching between the captured image and the images-for-determination of the plurality of types stored in the memory 16C in advance and determines that the captured image is the same as or similar to the image-for-determination indicating a flat agricultural field, for example, the controller 15 determines that the state of the agricultural field is flat (YES in S53). If the controller 15 determines that the state of the agricultural field is flat (YES in S53), the controller 15 maintains the setting information indicating the rotation speed of the PTO shaft AX to maintain the current rotation speed of the PTO shaft AX (S55).

If the controller 15 determines in S53 that the state of the agricultural field is not flat (NO in S53), on the other hand, the controller 15 changes the setting information indicating the rotation speed of the PTO shaft AX to the setting information indicating the second rotation speed stored in the fourth data table TB4 illustrated in FIG. 10 to change the rotation speed of the PTO shaft AX to the second rotation speed which is higher than the first rotation speed (S54). The controller 15 changes the rotation speed of the PTO shaft AX to the second rotation speed with the PTO transmission 41 by controlling the PTO transmission 41.

After S52, S54, or S55, the controller 15 determines whether the work has ended (S56). If the controller 15 receives an instruction to end the raking from the operator (YES in S56), for example, the controller 15 ends the process. If there is no instruction to end the raking from the operator (NO in S56), the controller 15 returns to step S51.

That is, if the controller 15 determines that the image captured by the rear camera 17B is the image GB2 (i.e., if the swath GL is triangular and hard), the controller 15 changes (reduces) the rotation speed of the PTO shaft AX to the first rotation speed. If the controller 15 determines that the image captured by the front camera 17A is the third feature image (i.e., if the agricultural field is uneven), the controller 15 changes (increases) the rotation speed of the PTO shaft AX to the second rotation speed. In other cases (if the swath GL is not triangular and hard and the agricultural field is flat), the controller 15 maintains the current rotation speed of the PTO shaft AX.

A working machine (raking machine 1C) according to an aspect of a preferred embodiment of the present invention includes a traveling vehicle 2C, a rake 3C (working device) to rake grass in an agricultural field and form a swath, the rake 3C being coupled to the traveling vehicle 2C, a sensor 17 to obtain a state of the grass or the swath in the agricultural field, and a controller 15 to, when the rake 3C performs raking, change one or more pieces of setting information regarding the rake 3C based on the state obtained by the sensor 17. With this configuration, in a case where the rake 3C performs raking, the controller 15 changes the setting information regarding the rake 3C based on the state obtained by the sensor 17, making it possible to easily make the products of raking performed by the rake 3C, that is, shapes of swaths, as uniform as possible. With this, an operator need not perform an operation to change the conditions in which the raking is performed by the rake 3C while visually checking the state of the grass or the swath in the agricultural field.

The sensor 17 may include at least one imager (a front camera 17A and/or a rear camera 17B) to obtain imaging data by capturing an image of the state of the grass or the swath in the agricultural field. The controller 15 may be configured or programmed to change the one or more pieces of setting information regarding the rake 3C based on the imaging data obtained by the at least one imager. With this configuration, since the controller 15 changes the setting information regarding the rake 3C based on the imaging data captured by the at least one imager, the controller 15 can change the state of products of the raking performed by the rake 3C in real-time in accordance with the state of the grass or the swath in the agricultural field. As a result, an appropriate swath can be formed in accordance with the state of the grass or the swath in the agricultural field.

The controller 15 may be configured or programmed to change the one or more pieces of setting information regarding the rake 3C based on the imaging data of a work product obtained by the first imager (rear camera 17B) and indicating the state of the formed swath. With this configuration, since the controller 15 changes the setting information regarding the rake 3C based on the imaging data of the work product obtained by the rear camera 17B and indicating the state of the formed swath, the controller 15 can change the state of products of the raking performed by the rake 3C in real-time in accordance with the state of the formed swath. As a result, an appropriate swath can be formed.

The controller 15 may be configured or programmed to change the one or more pieces of setting information regarding the rake 3C based on the imaging data which is pre-work imaging data obtained by the second imager (front camera 17A) before raking is performed and indicating the state of the grass in the agricultural field. With this configuration, since the controller 15 changes the setting information regarding the rake 3C based on the pre-work imaging data obtained by the front camera 17A and indicating the state of the grass in the agricultural field, the controller 15 can change the state of products of the raking performed by the rake 3C in real-time in accordance with the state of the grass in the agricultural field before the raking. As a result, an appropriate swath can be formed.

The controller 15 may be configured or programmed to change the one or more pieces of setting information regarding the rake 3C based on the imaging data of a work product obtained by the first imager (rear camera 17B) and indicating the state of the formed swath, and the imaging data which is pre-work imaging data obtained by the second imager (front camera 17A) before raking is performed and indicating the state of the grass in the agricultural field. With this configuration, since the controller 15 changes the setting information regarding the rake 3C based on the imaging data of the work product obtained by the rear camera 17B and indicating the state of the formed swath and the pre-work imaging data obtained by the front camera 17A and indicating the state of the grass in the agricultural field, the controller 15 can change the state of products of the raking performed by the rake 3C in real-time in accordance with the state of the grass in the agricultural field before the raking and the state of the formed swath. As a result, an appropriate swath can be formed.

The rake 3C may include a rake unit 43 including a body 44, a rotor 45 rotatably supported by the body 44, tine arms (i.e., arms 46) coupled to the rotor 45 and radially extending from the rotor 45, one or more tines 47 coupled to each of the arms 46 and extending downward, and a plate-shaped member (swath curtain) 48 for forming the swath. The controller 15 may be configured or programmed to change one of the one or more pieces of setting information regarding the rake 3C that indicates a clearance between the plate-shaped member 48 and the rake unit 43 based on the imaging data of the work product. With this configuration, since the controller 15 changes the setting information indicating the clearance between the plate-shaped member 48 and the body 44 (rake unit 43) based on the imaging data of the work product indicating the state of the formed swath, the controller 15 can change the clearance between the plate-shaped member 48 and the body 44 (rake unit 43) in the rake 3C in real-time. As a result, an appropriate swath can be formed.

The controller 15 may be configured or programmed to change one of the one or more pieces of setting information regarding the rake 3C that indicates a clearance between the plate-shaped member 48 and the rake unit 43 based on the pre-work imaging data. With this configuration, since the controller 15 changes the setting information indicating the clearance between the plate-shaped member 48 and the rake unit 43 based on the pre-work imaging data indicating the state of the grass in the agricultural field, the controller 15 can change the clearance between the plate-shaped member 48 and the rake unit 43 in the rake 3C in real-time. As a result, an appropriate swath can be formed.

The rake 3C may include a rake unit 43. The controller 15 may be configured or programmed to change one of the one or more pieces of setting information regarding the rake 3C that indicates a distance between a lower end of the rake unit 43 and the agricultural field based on the pre-work imaging data. With this configuration, since the controller 15 can change the setting information indicating the distance between the lower end of the rake unit 43 and the agricultural field based on the pre-work imaging data indicating the state of the grass in the agricultural field, the distance between the lower end of the rake unit 43 of the rake 3C and the agricultural field can be changed in real-time. As a result, an appropriate swath can be formed.

The rake 3C may include a rake unit 43. The controller 15 may be configured or programmed to change one of the one or more pieces of setting information regarding the rake 3C that indicates a travel speed of the traveling vehicle 2C based on the pre-work imaging data. With this configuration, since the controller 15 changes the setting information indicating the travel speed of the traveling vehicle 2C based on the pre-work imaging data indicating the state of the grass in the agricultural field, the travel speed of the traveling vehicle 2C can be changed in real-time. As a result, an appropriate swath can be formed.

The traveling vehicle 2C may include a prime mover 11 and a power take-off shaft AX driven by power from the prime mover 11. The rake 3C may include a rake unit 43. The controller 15 may be configured or programmed to changes one of the one or more pieces of setting information regarding the rake 3C that indicates a rotation speed of the power take-off shaft AX based on the pre-work imaging data. With this configuration, since the controller 15 changes the setting information indicating the rotation speed of the power take-off shaft AX based on the pre-work imaging data indicating the state of the grass in the agricultural field, the rotation speed of the power take-off shaft AX can be changed in real-time. As a result, an appropriate swath can be formed.

The controller 15 may be configured or programmed to change one of the one or more pieces of setting information regarding the rake 3C that indicates a rotation speed of the power take-off shaft AX based on the imaging data regarding the work product. With this configuration, since the controller 15 changes the setting information indicating the rotation speed of the power take-off shaft AX based on the imaging data of the work product indicating the state of the formed swath, the controller 15 can change the rotation speed of the power take-off shaft AX in real-time. As a result, an appropriate swath can be formed.

Although the first driver 49A changes the height positions of the rake units 43 in the above preferred embodiment, height of the coupling frame 42, the tines 47, or the arms 46 may be changed, insofar as the height of the tines 47 is changed. The coupler 8 may be used instead of the first driver 49A, and the height positions of the rake units 43 may be changed using a raising and lowering function of the coupler 8.

Figure 18:
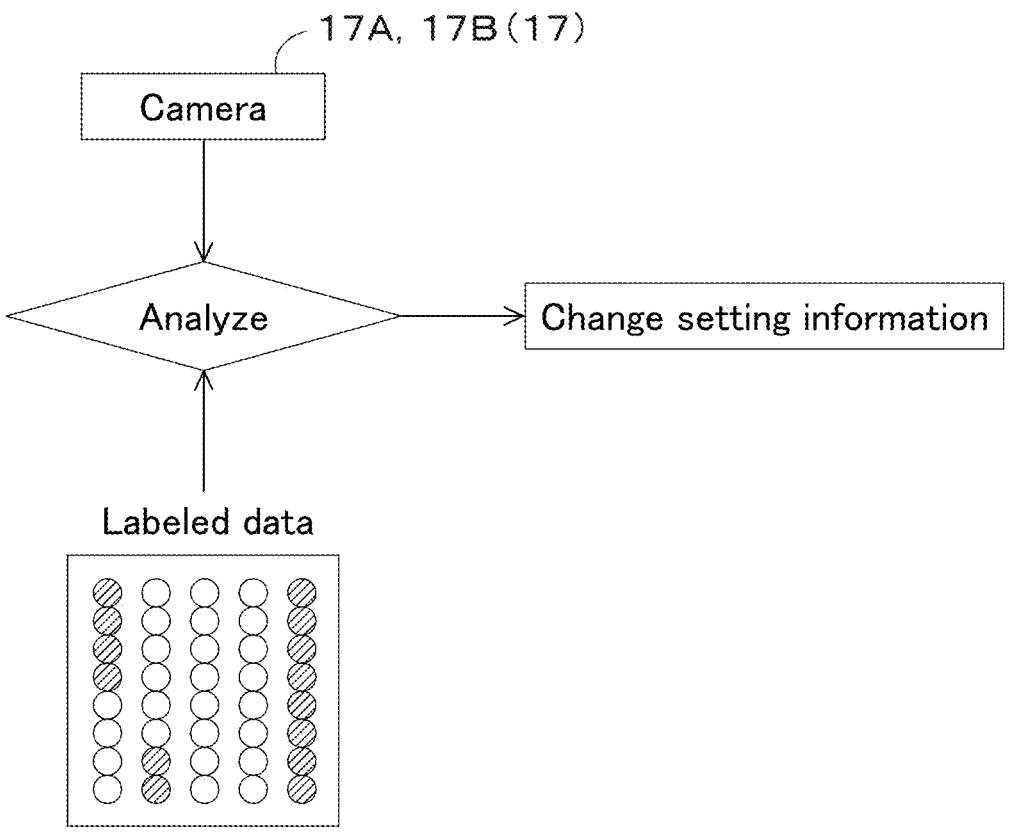
FIG. 18 is a schematic diagram illustrating how a controller determines imaging data through machine learning.

As illustrated in FIG. 18, the controller 15 may perform, using artificial intelligence (AI), a process of analyzing imaging data of a work product obtained by the first imager (rear camera 17B) and indicating the state of a formed swath and pre-work imaging data obtained by the second imager (front camera 17A) and indicating the state of grass in an agricultural field. The controller 15 may use, analyses and learning (i.e., machine learning) based on imaging data and training data (labeled data) to determine, for example, whether the amount of cut grass (grass) in an agricultural field is larger than or equal to the first upper limit value or smaller than or equal to the first lower limit value, whether the width (swath width) of a swath GL is larger than or equal to the first upper limit width or smaller than or equal to the first lower limit width, and/or whether a captured image is the same as or similar to the first to fourth feature images.

Note that the controller 15 of the raking machine 1C may set priority levels for the first to fourth adjustment modes in accordance with an instruction about priority levels from the operator, for example, and enter an adjustment mode of the highest priority level. The first to fourth adjustment modes are: a mode to adjust the position of the plate-shaped member (swath curtain) 48 defining the distance; a mode to adjust the height of the rake unit(s) (tines) 43; a mode to adjust the travel speed of the traveling vehicle 2C; and a mode to adjust the rotation speed of the PTO shaft AX, respectively. When the priority level decreases in order of the second adjustment mode, the third adjustment mode, the fourth adjustment mode, and the first adjustment mode, the second adjustment mode has the highest priority level and is entered. The controller 15 of the raking machine 1C may disable, among the first to fourth adjustment modes, adjustment modes that are not applicable depending on whether the rake 3C is of the first type 1CA, the second type 1CB, or the third type 1CC. With the first type 1CA, for example, since the plate-shaped member (swath curtain) 48 is not provided, the first adjustment mode is disabled. When the height of the rake unit(s) (tines) 43 is not changeable in the rake 3C, the second adjustment mode is disabled.

The following arrangement may be used: if an error occurs during the image analysis or the pattern matching in S11 or S13 illustrated in FIG. 13, S21, S23, or S24 illustrated in FIG. 14, S31 or S32 illustrated in FIG. 15, or S41, S43, or S44 illustrated in FIG. 16 (e.g., if the determination cannot be made or if a value larger than or equal to the first upper limit value, a value smaller than or equal to the first lower limit value, a value larger than or equal to the first upper limit width, or a value smaller than or equal to the first lower limit width is outside the range), the controller 15 of the raking machine 1C maintains the current setting information regarding the rake 3C, temporarily refrains from changing the setting information regarding the rake 3C, and stores occurrence of the error in the memory 16C. In this case, even if an unforeseen error occurs, it is possible to eliminate or reduce the likelihood that the rake 3C will perform an unexpected operation.

First Variation

In a first variation of a preferred embodiment of the present invention, the raking machine 1C includes a position detector 60C (positioning device). The tedding machine 1B includes a rear camera 17B that captures an image of grass (cut grass) tedded in an agricultural field and, during tedding, stores the captured image of the grass (cut grass) tedded in the agricultural field and positional information at the time of the image capturing such that the captured image and the positional information are associated with each other or transmits the captured image and the positional information to an external device (a server etc.) to store the captured image and the positional information in the external device. The controller 15 of the raking machine 1C may obtain one or more pieces of imaging data in a tedding step preceding a raking step which are associated with one or more pieces of positional information indicating position(s) at which the one or more pieces of imaging data were obtained, and change the setting information regarding the rake 3C (working device) based on one of the obtained one or more pieces of imaging data that corresponds to one of the one or more pieces of positional information that matches measured position information obtained by the position detector 60C of the raking machine 1C.

With the configuration according to the first variation, since the controller 15 changes the setting information regarding the rake 3C (working device) based on imaging data obtained in the tedding step preceding the raking process, the state of products of the raking performed by the rake 3C (working device) can be changed in accordance with the state of grass or swath in an agricultural field. Therefore, an appropriate swath can be formed in accordance with the state of grass or a swath in the agricultural field.

Second Variation

In a second variation of a preferred embodiment of the present invention, the raking machine 1C includes a position detector 60C (positioning device), a memory 16C, and a communicator 82C. During raking performed by the rake 3C in an agricultural field, that is, during formation of a swath GL, the controller 15 generates work product record data in which measured position information obtained by the position detector 60C, imaging data (e.g., image(s) captured by the rear camera 17B) of the work products, and time information (timestamp(s)) are associated with each other, and stores the record data in the memory 16C. The controller 15 then causes the communicator 82C to transmit the record data stored in the memory 16C to an external information processor (e.g., the external device 83 or the assistor 84) to store the record data in the external device 83 or the assistor 84. The products of raking can be checked based on the record data of the raking machine 1C using the external device 83 or the assistor 84.

With the configuration according to the second variation, since the controller 15 generates work product record data in which measured position information obtained by the position detector 60C (positioning device) and imaging data of the work products are associated with each other, stores the record data in the memory 16C, and causes the communicator 82C to transmit the record data stored in the memory 16C to an external information processor, the baling machine 1D can effectively use the work product record data in a baling step (i.e., when grass is formed into rolls) after the raking step.

As illustrated in FIG. 1, the grass management system may also include a third physical quantity detector 50. As with the first physical quantity detector 81 and the second physical quantity detector 150, the third physical quantity detector 50 detects a physical quantity (quantities) relating to grass such as component(s) of grass (moisture content and/or protein). The third physical quantity detector 50 is provided in or on the raking machine 1C. The third physical quantity detector 50 obtains at least moisture value(s) (third moisture value(s)) of grass at the time of raking performed by the raking machine 1C.

The third physical quantity detector 50 is provided in or on rake unit(s) 43 and obtains the third moisture value(s) of cut grass (grass) at the time of raking. The third physical quantity detector 50 is a spectrometer, for example, and analyzes the moisture in grass by emitting light having a certain frequency onto the grass and receiving light reflected from the grass. The third physical quantity detector 50 is connected to the controller 15 or the memory 16C of the traveling vehicle 2C. The controller 15 stores the third moisture value(s) obtained by the third physical quantity detector 50 and position(s) at which raking was performed (hereinafter "raking positions", latitude and longitude) detected by the position detector 60C in the memory 16C as map data regarding the third moisture values in which the third moisture values and the raking positions are associated with each other. As illustrated in FIG. 19, the memory 16C stores map data regarding third moisture values in which detected raking positions and the third moisture values are associated with each other.

When the controller 15 or the third physical quantity detector 50 detects a start of traveling of the traveling vehicle 2C, a start of transmission of power to the rake 3C from the PTO shaft AX, or a start of driving of the rake units 43, for example, the third physical quantity detector 50 begins to obtain third moisture values. When the controller 15 or the third physical quantity detector 50 detects an end of the traveling of the traveling vehicle 2C, an end of the transmission of power to the rake 3C from the PTO shaft AX, or an end of the driving of the rake units 43, the third physical quantity detector 50 stops obtaining the third moisture values. The start and the stop of the obtaining of the third moisture values by the third physical quantity detector 50 are not limited to the above example, and the obtaining of the third moisture values may start or stop when the manipulator provided near the operator's seat of the traveling vehicle 2C is operated or when a start or a stop of the mowing is requested using the display, the switch, or the like provided near the operator's seat. Alternatively, a switch for requesting the third physical quantity detector 50 to start or stop obtaining the third moisture values may be provided near the operator's seat.

The controller 15 may add the third moisture values to the work product record data and cause the communicator 82C to transmit the record data to an external information processor. In this case, the baling machine 1D can use the work product record data more effectively in the baling step (i.e., when grass is formed into rolls) after the raking step.

Although the traveling vehicle 2C includes the controller 15 in the above preferred embodiments and the variations, the rake 3C (working device) may include the controller 15. With this configuration, the same effects as in the above preferred embodiments and the variations can be achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a traveling vehicle;
a working device coupled to the traveling vehicle to rake grass in an agricultural field and form a swath;
a sensor to obtain a state of the grass or the swath in the agricultural field; and
a controller to, when the working device performs raking, change one or more pieces of setting information regarding the working device based on the state obtained by the sensor, wherein the sensor includes at least one imager to obtain imaging data by capturing an image of the state of the grass or the swath in the agricultural field;
the controller is configured or programmed to change the one or more pieces of setting information regarding the working device based on the imaging data obtained by the at least one imager;
the at least one imager includes a first imager to obtain imaging data by capturing an image of the state of the swath formed by the working device;
the working device includes a rake assembly including a body, a rotor rotatably supported by the body, tine arms coupled to the rotor and radially extending from the rotor, one or more tines coupled to each of the tine arms and extending downward, and a plate to form the swath;
the controller is configured or programmed to change the one of the one or more pieces of setting information regarding the working device that indicates a clearance between the plate and the body based on the imaging data of the work product obtained by the first imager and indicating the state of the formed swath; and
the controller is configured or programmed to:
    (i) change the one or more pieces of setting information to first setting information to pull out the plate so that the clearance achieves an increased distance indicated by the first setting information if the controller determines that a width of the swath indicated by the imaging data is smaller than or equal to a first lower limit width;
    (iia) change the one or more pieces of setting information to second setting information to push inward the plate so that the clearance achieves a reduced distance indicated by the second setting information if the controller determines, after determining that the width of the swath indicated by the imaging data is not smaller than or equal to the first lower limit width, that the swath indicated by the imaging data has a two-pile shape;
    (iib) change the one or more pieces of setting information to the second setting information to push inward the plate so that the clearance achieves the reduced distance indicated by the second setting information if the controller determines, after determining that the width of the swath indicated by the imaging data is not smaller than or equal to the first lower limit width and the swath indicated by the imaging data does not have the two-pile shape, that the width of the swath indicated by the imaging data is larger than or equal to the first upper limit width; and
    (iii) employ current setting information if the controller determines that the swath indicated by the imaging data does not have the two-pile shape, the width of the swath is not larger than or equal to the first upper limit width, and the width of the swath is not smaller than or equal to the first lower limit width.

2. The working machine according to claim 1, wherein the at least one imager includes a second imager to obtain imaging data by capturing an image of the state of the grass in the agricultural field; and
the controller is configured or programmed to change the one or more pieces of setting information regarding the working device based on the imaging data which is pre-work imaging data obtained by the second imager before raking is performed and indicating the state of the grass in the agricultural field.

3. The working machine according to claim 2, wherein the working device includes a rake assembly including a body, a rotor rotatably supported by the body, tine arms coupled to the rotor and radially extending from the rotor, one or more tines coupled to each of the tine arms and extending downward, and a plate to form the swath; and the controller is configured or programmed to change one of the one or more pieces of setting information regarding the working device that indicates a clearance between the plate and the body based on the pre-work imaging data.

4. The working machine according to claim 2, wherein the working device includes a rake assembly including a body, a rotor rotatably supported by the body, tine arms coupled to the rotor and radially extending from the rotor, and one or more tines coupled to each of the tine arms and extending downward; and the controller is configured or programmed to change one of the one or more pieces of setting information regarding the working device that indicates a distance between a lower end of the rake assembly and the agricultural field based on the pre-work imaging data.

5. The working machine according to claim 2, wherein the working device includes a rake assembly including a body, a rotor rotatably supported by the body, tine arms coupled to the rotor and radially extending from the rotor, and one or more tines coupled to each of the tine arms and extending downward; and the controller is configured or programmed to change one of the one or more pieces of setting information regarding the working device that indicates a travel speed of the traveling vehicle based on the pre-work imaging data.

6. The working machine according to claim 2, wherein the traveling vehicle includes a prime mover and a power take-off shaft driven by power from the prime mover;

the working device includes a rake assembly including a body, a rotor which is rotatably supported by the body and to which power from the power take-off shaft is transmitted, tine arms coupled to the rotor and radially extending from the rotor, and one or more tines coupled to each of the tine arms and extending downward; and the controller is configured or programmed to change one of the one or more pieces of setting information regarding the working device that indicates a rotation speed of the power take-off shaft based on the pre-work imaging data.

7. The working machine according to claim 1, wherein the at least one imager includes a first imager to obtain imaging data by capturing an image of the state of the swath formed by the working device and a second imager to obtain imaging data by capturing an image of the state of the grass in the agricultural field; and the controller is configured or programmed to change the one or more pieces of setting information regarding the working device based on the imaging data of a work product obtained by the first imager and indicating the state of the swath, and the imaging data which is pre-work imaging data obtained by the second imager before raking is performed and indicating the state of the grass in the agricultural field.

8. The working machine according to claim 1, wherein the traveling vehicle includes a prime mover and a power take-off shaft driven by power from the prime mover;

the working device includes a rake assembly including a body, a rotor which is rotatably supported by the body and to which power from the power take-off shaft is transmitted, tine arms coupled to the rotor and radially extending from the rotor, and one or more tines coupled to each of the tine arms and extending downward; and the controller is configured or programmed to change one of the one or more pieces of setting information regarding the working device that indicates a rotation speed of the power take-off shaft based on the imaging data of the work product.

9. The working machine according to claim 1, further comprising:

a position sensor to obtain measured position information; wherein the controller is configured or programmed to:

obtain one or more pieces of imaging data in a tedding step preceding a raking step, the one or more pieces of imaging data being associated with one or more pieces of positional information indicating one or more positions at which the one or more pieces of imaging data have been obtained and change the one or more pieces of setting information regarding the working device based on one of the obtained one or more pieces of imaging data that corresponds to one of the one or more pieces of positional information that matches the measured position information obtained by the positioning device.

10. The working machine according to claim 1, further comprising:

a position sensor to obtain measured position information;

a memory; and a communicator; wherein the controller is configured or programmed to generate work product record data in which the measured position information obtained by the positioning device and the imaging data of the work product are associated with each other, cause the memory to store the work product record data, and cause the communicator to transmit the work product record data stored in the memory to an external information processor.

\* \* \* \* \*